US012709939B2

(12) United States Patent
Hansen et al.

(10) Patent No.: US 12,709,939 B2
(45) Date of Patent: Aug. 18, 2026

(54) SHIMMING CONCEPTS FOR FENESTRATION UNITS

(71) Applicant: Pella Corporation, Pella, IA (US)

(72) Inventors: Ted L. Hansen, Pella, IA (US); Todd A. Bernhagen, Pella, IA (US)

(73) Assignee: Pella Corporation, Pella, IA (US)

( * ) Notice: Subject to any disclaimer, the term of this patent is extended or adjusted under 35 U.S.C. 154(b) by 332 days.

(21) Appl. No.: 18/514,273

(22) Filed: Nov. 20, 2023

(65) Prior Publication Data

US 2024/0200392 A1 Jun. 20, 2024

Related U.S. Application Data

(60) Provisional application No. 63/432,497, filed on Dec. 14, 2022.

(51) Int. Cl.
*E06B 1/60* (2006.01)

(52) U.S. Cl.
CPC .................................. *E06B 1/6069* (2013.01)

(58) Field of Classification Search
CPC ..... E06B 1/36; E06B 1/52; E06B 1/56; E06B 1/603; E06B 1/6069; E06B 1/6076; E04F 21/0015; E04F 21/0023
USPC .......................................................... 52/126.1
See application file for complete search history.

(56) References Cited

U.S. PATENT DOCUMENTS

| | | | | | |
|---|---|---|---|---|---|
| 1,045,984 | A | * | 12/1912 | King | E04G 17/0721 269/224 |
| 2,524,961 | A | | 10/1950 | Robert, Jr. | |
| 2,539,703 | A | * | 1/1951 | Sato | E04G 25/066 254/105 |
| 2,651,814 | A | * | 9/1953 | Lester, Jr. | E06B 1/6069 49/505 |
| 2,652,907 | A | * | 9/1953 | Miller | E06B 3/9885 49/504 |
| 2,753,602 | A | * | 7/1956 | Ringle | E06B 1/10 52/212 |
| 2,772,596 | A | * | 12/1956 | Trussell | B62D 17/00 425/DIG. 129 |
| 2,793,467 | A | * | 5/1957 | Matter | F16M 11/22 248/188.2 |
| 2,813,348 | A | * | 11/1957 | Kristensen | E04F 21/0015 33/413 |
| 2,914,817 | A | * | 12/1959 | Jackson | E06B 1/52 49/505 |

(Continued)

FOREIGN PATENT DOCUMENTS

| | | |
|---|---|---|
| BE | 1029045 A1 | 8/2022 |
| CA | 2138579 A1 | 6/1995 |

(Continued)

*Primary Examiner* — James M Ference

(57) ABSTRACT

A shimming assembly comprising a base that defines a raised contact surface and a pivot pin defining a rotation axis of the shimming assembly, the base including a base inclined surface, and a slider that is slidably coupled to the base such that the slider is slidable along the base inclined surface in response to a user-applied sliding force, the slider being coupled to the base such that the slider is rotatable about the rotation axis defined by the pivot pin in response to a user-applied torque to transition the shimming assembly from an active configuration to a stowed configuration.

20 Claims, 27 Drawing Sheets

(56) References Cited

U.S. PATENT DOCUMENTS 2,932,122 A * 4/1960 Matter ................. A47B 91/022 248/649
3,171,632 A * 3/1965 Jines ........................ F16M 7/00 254/104
3,571,996 A * 3/1971 Braswell ............... E06B 3/9885 49/505
3,836,118 A * 9/1974 Meyer ................... E06B 3/5409 269/104
3,930,738 A * 1/1976 Thuss ................... E06B 1/6015 403/374.1
4,232,068 A * 11/1980 Hoh ...................... E06B 1/6069 428/167
4,368,869 A * 1/1983 Gelvezon ............ A47L 15/4253 248/188.4
4,558,548 A * 12/1985 Hieger ................ E04F 13/0826 52/235
4,625,489 A 12/1986 Bogle
4,713,922 A * 12/1987 Ingold ................... E06B 1/6069 52/656.2
4,731,965 A 3/1988 Jensen
4,776,548 A * 10/1988 Bezenek .................. F16M 7/00 D34/28
4,873,804 A * 10/1989 Kukke .................. E06B 1/6076 411/116
5,054,250 A * 10/1991 Foss ...................... E06B 1/6069 52/211
5,136,814 A * 8/1992 Headrick .................. E06B 1/70 49/471
5,167,677 A * 12/1992 Hammes ............... F24D 19/061 55/DIG. 35
5,655,342 A * 8/1997 Guillemet ................. E06B 1/60 49/505
5,655,343 A * 8/1997 Seals ..................... E06B 1/6069 52/745.15
5,673,516 A * 10/1997 Hughes ............... E05D 15/0669 49/425
5,694,996 A * 12/1997 Vigenberg ............ E04D 13/033 160/84.04
5,815,992 A 10/1998 Wells et al.
5,853,838 A * 12/1998 Siems ................... E06B 1/6069 156/247
5,890,297 A * 4/1999 Frasheski ................ E06B 1/603 33/194
5,953,862 A * 9/1999 Earhart ............... E04F 13/0853 52/98
6,006,817 A * 12/1999 Stone .................... E05D 15/242 160/229.1
6,018,916 A * 2/2000 Henry ................... E06B 1/6069 52/211
6,018,976 A * 2/2000 Wolf ...................... B21K 21/00 72/325
6,062,517 A * 5/2000 Torres .................. A47G 27/045 248/188.2
6,155,004 A * 12/2000 Earhart ............... E04F 13/0853 52/217
6,216,402 B1 * 4/2001 Van de Laar ......... E06B 1/6069 52/204.56
6,449,906 B1 * 9/2002 Jacobs ...................... E05F 7/04 49/409
6,560,934 B1 * 5/2003 Workman ............. E06B 1/6069 52/204.56
6,928,696 B2 * 8/2005 Wartman ................ E05D 15/24 16/99
7,104,019 B2 * 9/2006 Brunnhofer ........... E06B 3/2632 52/309.9
7,162,841 B2 * 1/2007 Kownacki ............. E06B 1/6053 52/213
7,240,435 B1 * 7/2007 Dowdakin .......... E04F 21/0015 33/194
7,270,600 B2 * 9/2007 Kim ......................... E06B 7/10 454/212
7,703,727 B2 * 4/2010 Selness ................ A47B 91/028 248/188.2
7,743,517 B1 * 6/2010 Burgese .............. E04F 21/0069 33/194
7,886,501 B2 * 2/2011 Bartlett ..................... E06B 3/88 52/800.1
7,913,470 B2 * 3/2011 Siodla ................ E06B 3/26303 403/364
8,112,941 B2 * 2/2012 Lenox ................. E06B 3/26303 49/176
8,176,709 B2 * 5/2012 Siodla ................ E06B 3/26303 52/204.5
8,490,332 B2 * 7/2013 Van Camp ................ E06B 1/70 49/468
8,490,347 B2 * 7/2013 Valler ................... E06B 3/9646 52/204.5
8,567,128 B2 * 10/2013 Van Camp ............ E06B 7/2314 49/468
8,813,437 B1 * 8/2014 Spofford ............... E06B 1/6069 52/213
8,955,195 B2 * 2/2015 Chang ................. E05D 15/0634 16/105
8,974,275 B2 * 3/2015 Woods ...................... F24F 7/04 454/238
9,127,504 B2 * 9/2015 Sprague .................... E06B 3/70
9,234,380 B2 * 1/2016 Hensley .............. E06B 3/26301
9,328,549 B1 * 5/2016 Alexander .............. E06B 1/325
10,113,356 B2 * 10/2018 Lenox ................. E05D 15/0621
10,130,174 B2 * 11/2018 Perrin ...................... B23Q 1/58
10,197,297 B2 * 2/2019 Daniels, II ............... F24F 11/56
10,246,886 B2 * 4/2019 Mitchell ............. E04F 21/0015
10,337,239 B2 * 7/2019 Header ................... E06B 3/365
10,415,299 B2 9/2019 Mitchell
10,563,449 B2 * 2/2020 McKenna ................. E06B 3/26
10,837,221 B2 * 11/2020 Cohen ....................... E06B 3/46
10,858,877 B2 * 12/2020 Hatzky ............... E06B 3/26305
10,947,772 B2 * 3/2021 Weavers ............... E06B 3/6715
11,060,344 B2 * 7/2021 Kling .................... E06B 7/2312
11,131,139 B2 * 9/2021 Cazarez ................ E06B 3/7001
11,174,668 B1 * 11/2021 Mazur ..................... E05C 9/004
11,313,170 B2 4/2022 Delcides-Borges
11,460,201 B2 10/2022 Daniels, II et al.
11,585,145 B1 * 2/2023 Nelson .................. E06B 1/6069
11,643,866 B1 5/2023 Roberts et al.
11,746,585 B2 * 9/2023 Kobayashi .............. E06B 1/603 52/215
11,746,586 B2 * 9/2023 Yamagami .............. E06B 1/603 52/213
11,795,756 B2 * 10/2023 Friezner ................ E06B 1/6069
12,270,236 B2 4/2025 Procton et al.
2003/0145531 A1 * 8/2003 Holder ..................... F16M 7/00 52/98
2006/0185249 A1 * 8/2006 Whittlesea .............. E05F 11/06 49/394
2008/0102744 A1 * 5/2008 Moore ................... B01D 53/30 454/249
2008/0110110 A1 * 5/2008 Burton .................. E06B 1/6084 52/741.1
2008/0120930 A1 * 5/2008 Jacobsen ............. E04D 13/0354 160/90
2008/0282627 A1 11/2008 Lenox et al.
2009/0044463 A1 2/2009 Moscone et al.
2010/0058678 A1 * 3/2010 Lutz ...................... E06B 1/6069 52/126.1
2011/0239560 A1 10/2011 Landeros
2012/0028563 A1 * 2/2012 Sacks ................... F24F 11/0001 454/258
2014/0311035 A1 * 10/2014 Gilliam ................. E06B 3/4636 49/506
2014/0345215 A1 11/2014 Magoon et al.
2015/0027082 A1 * 1/2015 Hoffman ............. E04F 21/1877 52/749.11
2015/0176326 A1 * 6/2015 Davis ........................ E06B 1/62 52/211
2018/0187475 A1 * 7/2018 Mitchell ............. E04F 21/0015
2018/0255744 A1 * 9/2018 Wagner ................ A01K 1/0064
2020/0032527 A1 * 1/2020 Hakeman .............. E06B 1/6015

(56) References Cited

U.S. PATENT DOCUMENTS

| | | | | |
|---|---|---|---|---|
| 2020/0056424 | A1* | 2/2020 | Farnes | E04D 13/0358 |
| 2020/0347665 | A1* | 11/2020 | Gordon | E06B 5/12 |
| 2021/0054685 | A1 | 2/2021 | Van Santen | |
| 2022/0316265 | A1 | 10/2022 | Farnes et al. | |
| 2024/0151096 | A1* | 5/2024 | Sahin | E06B 1/6069 |
| 2024/0200392 | A1* | 6/2024 | Hansen | E06B 1/6069 |
| 2024/0209679 | A1 | 6/2024 | Wilcox | |
| 2024/0344383 | A1* | 10/2024 | Smothers | E06B 1/64 |
| 2024/0344384 | A1* | 10/2024 | Morse | E06B 3/12 |
| 2024/0353128 | A1* | 10/2024 | Bernhagen | F24F 8/108 |

FOREIGN PATENT DOCUMENTS

| | | | | |
|---|---|---|---|---|
| CA | 2665981 | C | 11/2009 | |
| CA | 2858724 | C | 3/2021 | |
| DE | 102006012390 | A1 * | 9/2007 | E06B 1/6069 |
| EP | 2137369 | B1 | 12/2009 | |
| EP | 2385184 | A1 | 11/2011 | |
| JP | 2529731 | Y2 | 3/1997 | |
| KR | 10-2021-0085810 | A | 7/2021 | |

* cited by examiner

SHIMMING CONCEPTS FOR FENESTRATION UNITS

CROSS-REFERENCE TO RELATED APPLICATIONS

This application claims priority to U.S. Provisional Patent Application No. 63/432,497, entitled "Shimming Concepts for Fenestration Units," filed Dec. 14, 2022, the contents of which are hereby incorporated by reference in its entirety.

BACKGROUND

Inserting, centering, levelling, fixing, sealing, and/or insulating fenestration units (e.g., windows and doors) in a rough opening in a structure or a building can be time consuming. Generally, the industry norm is to use one or more shims (e.g., wooden shims) about a perimeter of the fenestration unit. After placement of the shims, a solid or liquid sealant and/or insulator subsequently placed positioned about the fenestration unit between the unit and the rough opening. The shims are scored (e.g., with a knife) and are broken off (e.g., using a hammer) generally flush with an edge of the rough opening and/or fenestration unit. Placing and breaking off the shims is time consuming and can result in dislocation, splintering, unintended damage, and other unwanted results as they are broken off.

SUMMARY

A fenestration unit including a shimming assembly, the shimming assembly having an active configuration in which the shimming assembly projects from between the fenestration unit and an opening in a building and a stowed configuration in which the shimming assembly no longer projects from between the fenestration unit and the opening in a building. Various aspects of this patent specification relate to shimming assemblies that facilitate efficient and effective installation, including promoting inserting, centering, levelling, fixing, sealing and/or insulation. In some embodiments, enhanced sealing and insulation, for example, is enhanced through the ability to dispose a substantially continuous and uninterrupted seal and/or insulator about a perimeter of a fully-shimmed fenestration unit. In some embodiments, a pre-assembled shimming assembly (e.g., pre-attached to the fenestration unit) that is configured to promote effective shipping, handling, insertion into the rough opening, centering, levelling, fixing, and ultimately finishing (e.g., hiding) the shimming assembly is provided.

According to one example ("Example 1"), a shimming assembly comprises a base that defines a raised contact surface and a pivot pin defining a rotation axis of the shimming assembly, the base including a base inclined surface and a slider that is slidably coupled to the base such that the slider is slidable along the base inclined surface in response to a user-applied sliding force, the slider being coupled to the base such that the slider is rotatable about the rotation axis defined by the pivot pin in response to a user-applied torque to transition the shimming assembly from an active configuration to a stowed configuration.

According to another example ("Example 2"), further to Example 1, the slider further includes a slider inclined surface that is slidable along the base inclined surface.

According to another example ("Example 3"), further to Example 2, the slider inclined surface and the base inclined surface engage in a complementary fit.

According to another example ("Example 4"), further to Example 2, the base inclined surface defines a groove, and the slider inclined surface defines a tongue that is engaged with the groove of the base.

According to another example ("Example 5"), further to Example 1, the raised contact surface of the base is dome-shaped.

According to another example ("Example 6"), further to Example 1, the slider further includes a slot that receives the pivot pin to slidably couple the slider and base.

According to another example ("Example 7"), further to Example 1, the shimming assembly further includes a handle portion associated with the slider, the handle portion being operable to receive the user-applied sliding force and the user-applied torque.

According to another example ("Example 8"), further to Example 1, the shimming assembly further comprises a spacer that is receivable between the slider and the base, the spacer including a spacer inclined surface that is operable to slidably engage the base inclined surface.

According to another example ("Example 9"), further to Example 8, the spacer is coupled to the slider by a break off connection such that the spacer is configured to be broken off from the slider via a break off force on the spacer without substantially damaging the slider.

According to another example ("Example 10"), further to Example 1, the pivot pin is positioned along a longitudinal centerline of the base.

According to one example ("Example 11"), a fenestration unit comprises a frame assembly including a frame member, and a shimming assembly rotatably coupled to the frame member such that the shimming assembly is rotatable between an active configuration in which the shimming assembly extends away from the frame member and a stowed configuration, in which the shimming assembly extends along the frame member. The shimming assembly includes a base including a pivot pin coupled to the frame, a slider that is slidably coupled to the base such that sliding the slider relative to the base increases an overall thickness of the shimming assembly, and a handle portion associated with the slider, the handle portion operable to receive a user-applied sliding force on the slider to increase the overall thickness of the shimming assembly.

According to another example ("Example 12"), further to Example 11, the frame assembly is installed in a building opening and the active configuration of the shimming assembly is defined by the handle portion projecting outwardly from between the frame and the building opening, the handle portion receiving the user-applied force when in the active configuration.

According to another example ("Example 13"), further to Example 11, the slider includes a slot in which the pivot pin is received such that the pivot pin is free to slide within the slot.

According to another example ("Example 14"), further to Example 13, the pivot pin engages with edges of the slot such that the pivot pin is inhibited from rotating within the slot.

According to another example ("Example 15"), further to Example 11, the frame assembly is installed in a building opening, the frame member is a sill member, and the shimming assembly is configured to increase in thickness by sliding the slider such that the fenestration unit is translated upward within the building opening.

According to one example ("Example 16"), a fenestration unit comprises a frame assembly configured to be installed in a building opening and a shimming assembly coupled to the frame assembly, the shimming assembly having an active configuration in which the shimming assembly projects more outwardly in a front-to-back direction from the frame assembly and a stowed configuration in which the shimming assembly projects more along the frame assembly. The shimming assembly includes a base defining a raised contact surface and a pivot pin, the base rotatably coupled to the frame and including a base inclined surface, a slider slidably coupled to the base such that the slider and base are operable to rotate together in response to a user-applied torque to the slider and the base, and a handle portion associated with at least one of the base and the slider, the handle portion operable to receive the user-applied torque to rotate the base and the slider to transition the shimming assembly from the active configuration to the stowed configuration.

According to another example ("Example 17"), further to Example 16, the slider further includes a slot, the slot operable to engage the pivot pin such that the slider and base rotate together.

According to another example ("Example 18"), further to Example 16, wherein the active configuration is defined by the handle portion projecting outwardly from between the frame and the building opening beyond an interior plane of the fenestration unit.

According to another example ("Example 19"), further to Example 18, the stowed configuration is defined by the handle portion no longer projecting outwardly from between the frame and the building opening and the handle portion being positioned within the interior plane of the fenestration unit.

According to another example ("Example 20"), further to Example 16, the raised contact surface is dome-shaped.

According to one example ("Example 21"), a shimming assembly has an active configuration and a stowed configuration, the shimming assembly comprising a base defining a raised contact surface operable to engage with an opening in a building in which a fenestration unit is to be installed and a slider coupled to the base such that the slider is slidable relative to the base by a user applied force between the fenestration unit and the opening in the building in which the fenestration unit is to be installed when the shimming assembly is in the active configuration, the slider including a handle portion operable to project outwardly from between the fenestration unit and the opening in the building when the shimming assembly is in an active configuration and operable to be transitioned to a stowed configuration in which the handle does not project outwardly from between the fenestration unit and the opening in the building and is received between the fenestration unit and the opening in the building.

According to another example ("Example 22"), further to Example 21, the raised contact surface is dome-shaped.

According to another example ("Example 23"), further to Example 21, the base is configured to be pivotably coupled to a frame of a fenestration unit such that the base is rotatable from the active configuration to the stowed configuration.

According to another example ("Example 24"), further to Example 21, the slider includes a tapered portion that increases in thickness from a first thickness to a second thickness, the slider being slidable against the base from a first position in which the first thickness defines a first overall height of the shimming assembly and a second position in which the second thickness defines a second overall height of the shimming assembly.

According to another example ("Example 25"), further to Example 21, the shimming assembly further comprising a spacer that is receivable with the slider to increase an overall height of the shimming assembly.

According to another example ("Example 26"), further to Example 25, the spacer is coupled to the slider by a break off feature such that the spacer is configured to be broken off from the shimming assembly via an applied break off force on the spacer when the shimming assembly is in the active configuration.

According to another example ("Example 27"), further to Example 25, the handle portion has a groove feature, and the spacer has a tongue feature configured to slidably engage with the groove feature.

According to one example ("Example 28"), a fenestration unit comprises a frame configured to be installed in an opening in a building and a shimming assembly coupled to the frame, the shimming assembly having an active configuration and a stowed configuration, the shimming assembly including, a base defining a raised contact surface operable to engage with the opening in a building in which the fenestration unit is to be installed, the base being rotatably coupled to the frame, a slider coupled to the base such that the slider is slidable relative to the base by a user applied force when the shimming assembly is in the active configuration between the fenestration unit and the opening in the building, the slider including a handle portion operable to project outwardly from between the frame of the fenestration unit and the opening in the building when the shimming assembly is in an active configuration and is operable to transition to the stowed configuration in which the handle portion is received between the fenestration unit and the opening in the building.

According to another example ("Example 29"), further to Example 28, the frame includes a plurality of frame members, and the base is rotatably coupled to one of the plurality of frame members of the frame.

According to another example ("Example 30"), further to Example 28, the active configuration includes the handle portion projecting substantially perpendicular to the frame member.

According to another example ("Example 31"), further to Example 28, the stowed configuration includes the handle portion extending substantially parallel to the frame member.

According to another example ("Example 32"), further to Example 28, the base has a pivot pin secured to the frame such that the base is rotatable about the pivot pin when transitioning from the active configuration to the stowed configuration.

According to another example ("Example 33"), further to Example 32, the frame has a receiving pocket, and the pivot pin is mounted in the receiving pocket.

According to another example ("Example 34"), further to Example 32, the base of the shimming assembly and the frame are pivotably coupled.

According to another example ("Example 35"), further to Example 28, the handle portion has a groove feature, and the slider has a tongue feature configured to slidably engage with the groove feature.

According to another example ("Example 36"), further to Example 28, the groove feature of the handle portion defines an inclined surface, and the tongue feature is configured to slidably engage with the inclined surface of the groove feature.

According to one example ("Example 37"), a fenestration unit installation comprises a fenestration unit having a frame, the fenestration unit having an interior side, an exterior side opposite the interior side, an intermediate portion between the interior and exterior sides, and a perimeter defined by the frame, the fenestration unit received in an opening in a building such that a gap is defined around the perimeter of the fenestration unit between the fenestration unit and the building, the fenestration unit including a shimming assembly in the gap between the building and the frame and being positioned in a stowed configuration such that the shimming assembly does not project beyond the intermediate portion of the fenestration unit at the perimeter of the fenestration unit and a seal system extending continuously about the perimeter of the fenestration unit in the gap between the fenestration unit and the building.

According to another example ("Example 38"), further to Example 37, the seal system extends continuously around the perimeter of the fenestration unit within the gap at a location interior to the shimming assembly when in the shimming assembly is in the stowed configuration.

According to another example ("Example 39"), further to Example 38, the seal system includes at least one of: a backer rod, a sealant, an interior air seal, and combinations thereof.

According to another example ("Example 40"), further to Example 38, the seal system includes an interior air seal in the form of flashing tape.

The foregoing examples are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Definitions and Terminology

Figure 1:
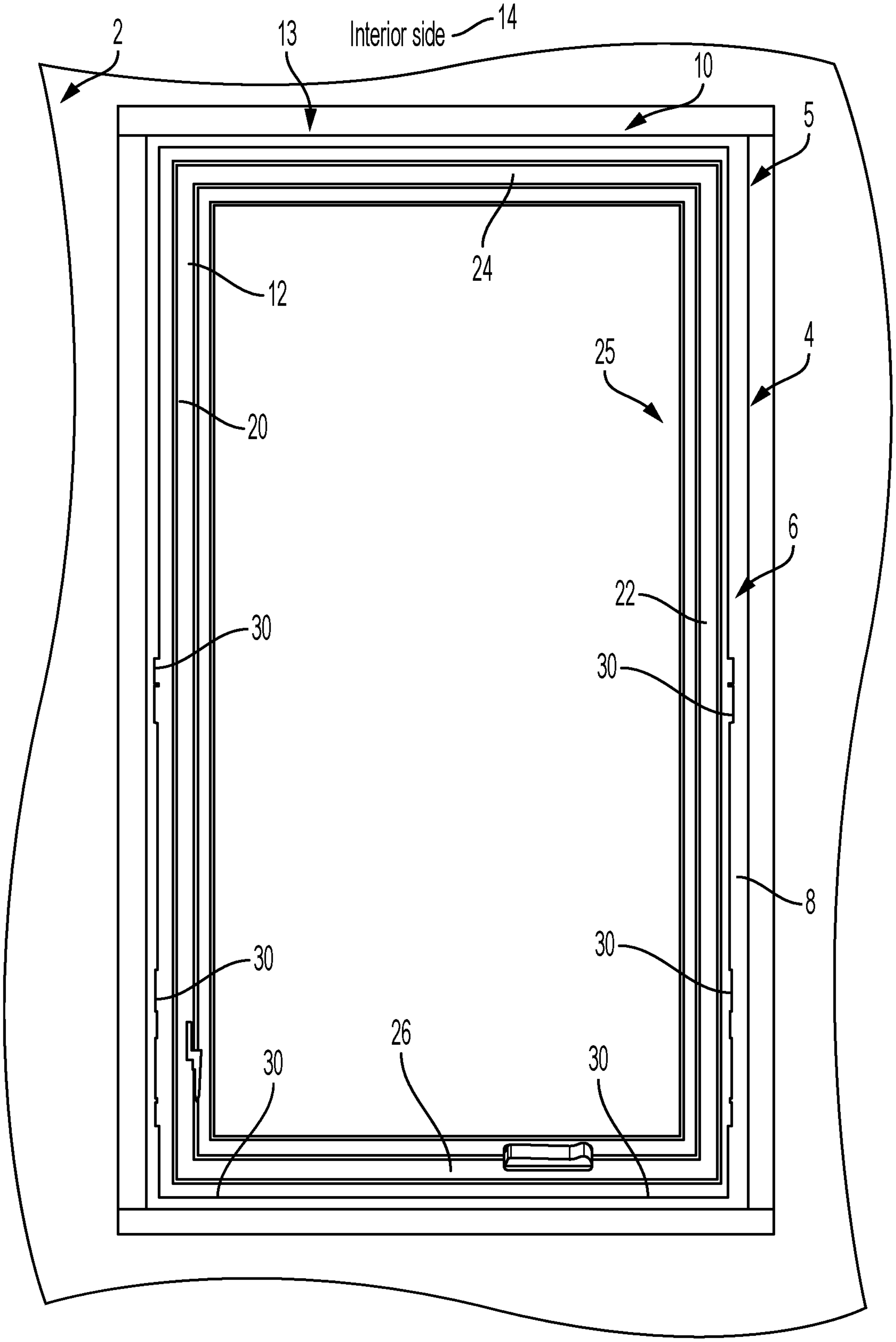
FIG. 1 is a front view of an interior side of a fenestration unit installation as viewed from an interior side of a building, in accordance with some embodiments.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

The terms "interior" and "exterior" are generally meant to reference opposite sides of a fenestration unit unless directly specified that "exterior" means exposed to the elements. For example, a fenestration unit installed within an interior of a building structure (e.g., a bedroom door) still has opposing "interior" and "exterior" sides as those terms are used in this patent specification, though the "exterior" is still disposed within the building structure itself.

The term "fenestration unit" is meant to cover any of a variety of products for providing venting, viewing, ingress, or egress from a building structure into which the fenestration unit is installed. Examples include doors, windows, and the like.

The term "structure" or "building" is meant to cover any of a variety of structures. Examples include single- or multi-family homes, residential buildings, commercial buildings, and others.

The term "opening" as used in the context of a "structure" or "building" may include rough openings in the structure, including rough openings in an exterior wall or boundary of the structure or internal wall or boundary of the structure.

Relative terms such as "upper", "lower", "top", "bottom", "horizontal," "vertical" and the like are construed broadly and are used to describe the orientation of components relative to one another, rather than in an absolute sense, unless otherwise indicated.

Description of Various Embodiments

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale but may be exaggerated to illustrate various aspects of the present disclosure, and in that regard, the drawing figures should not be construed as limiting.

FIG. 1 is a front view of a fenestration unit installation 5 as viewed from an interior side 14 of a building 2, in accordance with some embodiments. As shown, the fenestration unit installation 5 includes a fenestration unit 10 as installed in an opening 4 of the building 2, including any sealant 8 and fasteners (not shown) for securing the fenestration unit 10 in place.

Further referring to FIG. 1, the fenestration unit 10 is shown as would be viewed from an interior of the building 2. The fenestration unit 10 includes a frame assembly 12 (also referred to as frame 12), an interior side 14, an exterior side 16 opposite the interior side 14, an intermediate portion 28 (FIGS. 4 and 5) between the interior and exterior sides 14, 16, and a perimeter 13 defined by the frame 12. The fenestration unit 10 is received in the opening 4 in the building 2 such that a gap 6 is defined around the perimeter 13 of the fenestration unit 10 between the fenestration unit 10 and the building 2 itself. The frame 12 of fenestration unit 10 includes a plurality of frame members 25. In some embodiments, the plurality of frame members 25 includes a first jamb 20, a second jamb 22, a head 24, and a sill 26, alternatively described as a first side member 20, second side member 22, top member 24, and bottom member 26. Though a four-sided configuration is shown and described by way of example, other configurations (e.g., three-sided, five-sided, six-sided, curve top, circle-head, and so forth) are contemplated.

The frame 12 and its components may be configured to be installed within the opening 4 in the building 2. The frame 12 can be configured to maintain one or more glazing panels or other panels, which may include sheets of glass. The fenestration unit installation 5 may also include a seal system 8 extending continuously about the perimeter 13 of the fenestration unit 10 within the gap 6 between the fenestration unit 10 and the building 2. The seal system 8, though represented generally in FIG. 1, may include at least one of a backer rod, a sealant, an interior air seal, and combinations thereof. The seal system 8 may include an interior air seal in the form of a flashing tape.

The fenestration unit 10 of FIG. 1 further includes one or more shimming assemblies 30 (shown in FIGS. 2-3) in the gap 6 between the building 2 and the frame 12. The shimming assemblies 30 may be substantially similar to one another and thus are subsequently described collectively with regard to one of the shimming assemblies 30 (although it should be apparent that differing configurations between the plurality of shimming assemblies are also contemplated).

Figure 2:
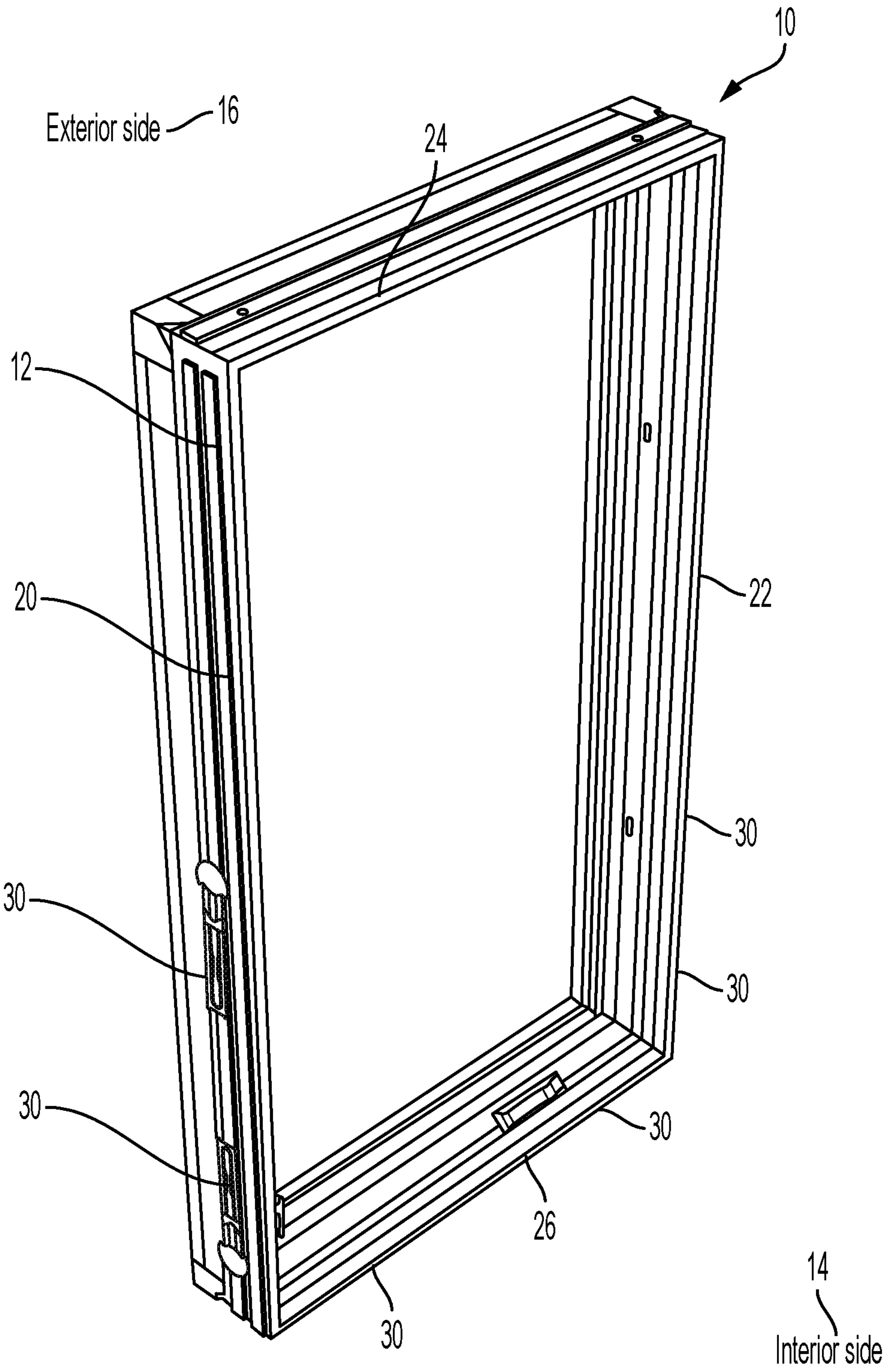
FIG. 2 is an isometric view of the fenestration unit of FIG. 1 including a shimming assembly in a stowed configuration, in accordance with some embodiments.
Figure 4:
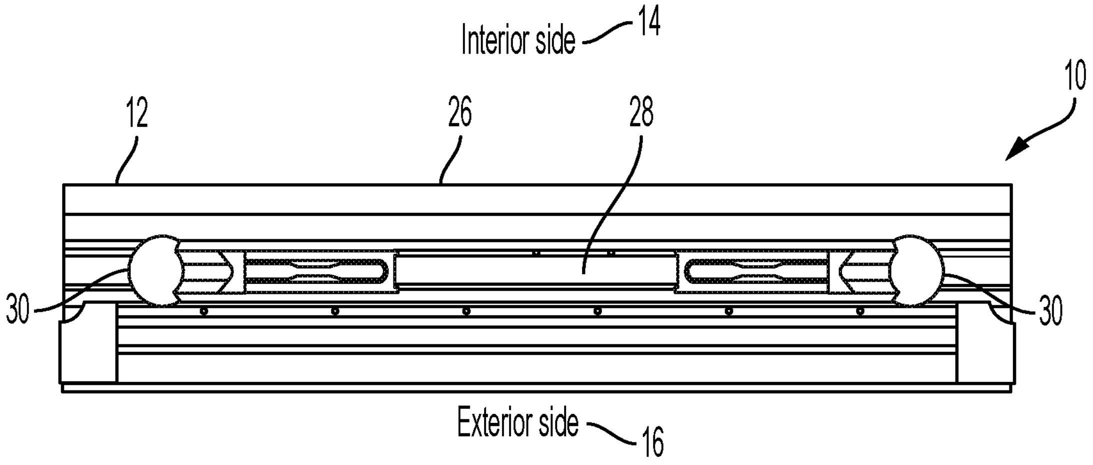
FIG. 4 is a bottom view of a sill of the fenestration unit of FIG. 1 with a plurality of shimming assemblies shown in the stowed configuration, in accordance with some embodiments.

The shimming assembly 30 may be positioned in a stowed configuration (FIGS. 2 and 4) such that the shimming assembly 30 does not project beyond the intermediate portion 28 (FIGS. 4 and 5) of the fenestration unit 10 at the perimeter 13 of the fenestration unit 10. The shimming assembly 30 may be coupled (e.g., pivotably or rotatably coupled) to the frame 12. Further, the seal system 8 may extend continuously around the perimeter 13 of the fenestration unit 10 within the gap 6 at a location interior to the shimming assembly 30 when the shimming assembly 30 is in the stowed configuration (FIGS. 2 and 4). For reference, each shimming assembly 30 (and, in particular, a plurality of shimming assemblies 30, each of which is optionally substantially similar to the other) is shown in FIG. 1 without the seal system 8 extending in front of those shimming assemblies 30. In practice, the seal system 8 may extend in front, or on the interior side, of each shimming assembly 30 continuously about the perimeter 13. In such a case, the shimming assemblies 30 would be hidden from view when observed from the interior side as shown in FIG. 1 as the seal system 8 would obscure them.

Figure 3:
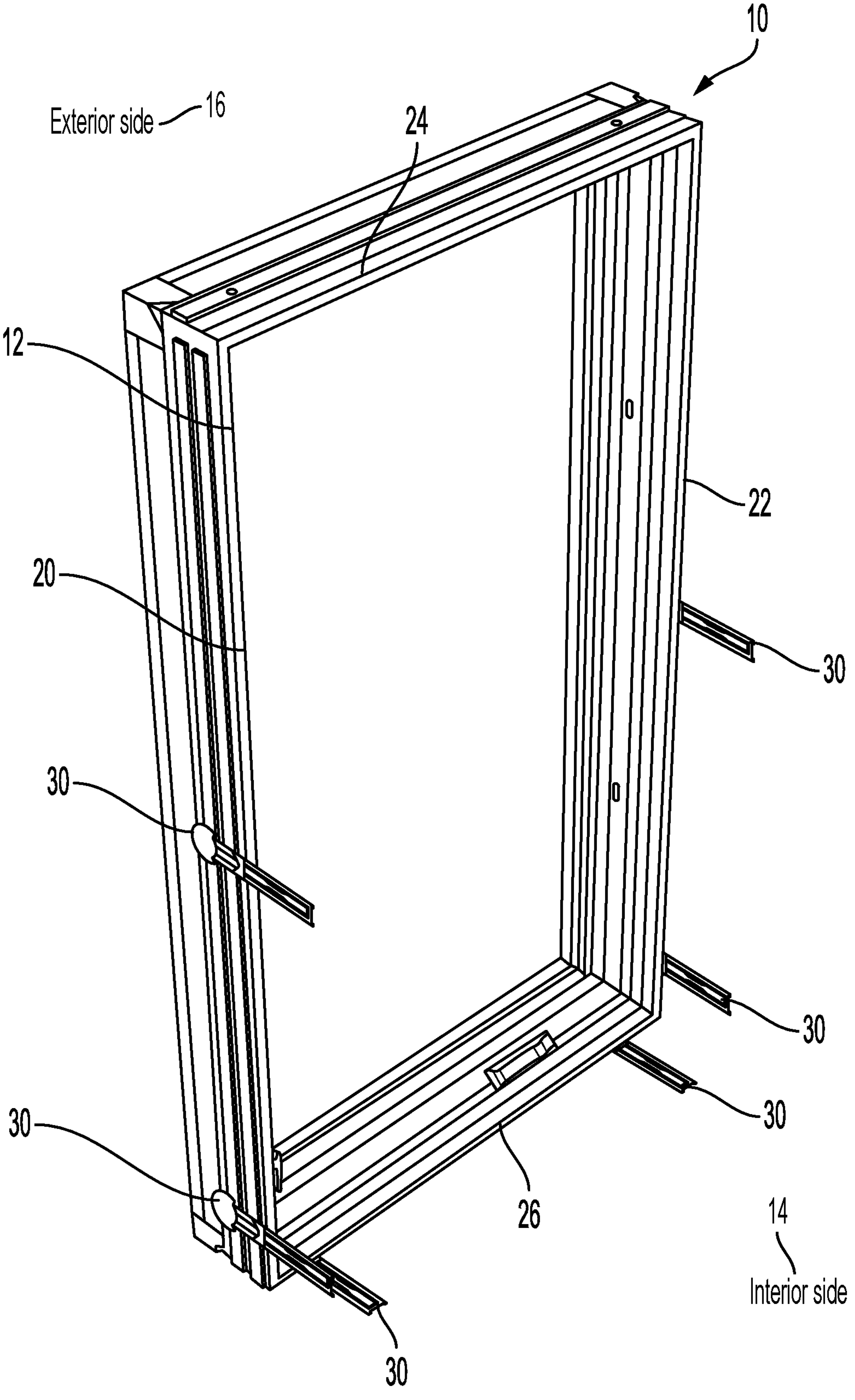
FIG. 3 is an isometric view of the fenestration unit of FIG. 1 including the shimming assembly in an active configuration, in accordance with some embodiments.

FIG. 2 is an isometric view of the fenestration unit 10 of FIG. 1 including each of the shimming assemblies 30 in the stowed configuration, in accordance with some embodiments. FIG. 3 is an isometric view of the fenestration unit 10 of FIG. 1 including each of the one or more shimming assemblies 30 in an active configuration, in accordance with some embodiments. As shown, each shimming assembly 30 is operable to facilitate levelling, centering, and/or straightening the fenestration unit 10 within the opening 4 in the building 2. In the active configuration (FIGS. 3 and 5), each shimming assembly 30 projects from between the fenestration unit 10 and the opening 4 in the building 2. In the active configuration (FIGS. 3 and 5), a user can apply a user applied force individually to each shimming assembly 30 to initiate a shimming action, which may result in leveling, centering, and/or straightening of the fenestration unit 10 within the opening 4 in the building 2. For reference, the user applied force in the embodiment of FIG. 3 would be in the direction from the interior side 14 toward the exterior side 16, or a pushing force. The shimming action of each of the shimming assemblies 30 will be subsequently described in more detail.

After the shimming action is complete, each shimming assembly 30 can be transitioned to the stowed configuration, as shown in FIGS. 2 and 4. In particular, each shimming assembly 30 can be rotated or articulated in a plane parallel to the longitudinal extension of the frame member 25 to which it is assembled. In the stowed configuration (FIGS. 2 and 4), each shimming assembly 30 no longer projects from between the fenestration unit 10 and the opening 4 in the building 2. Due to the ability to move to the stowed configuration (FIGS. 2 and 4), the shimming assembly 30 may not need to be cut off during fenestration unit 10 installation. Instead, each shimming assembly 30 can be stowed out of the way of further installation of the fenestration unit 10 into the opening 4 in the building 2. Removing the need to cut or break off (e.g., with a hammer) each shimming assembly may result in a reduction of installation time and labor and an increase in fenestration unit 10 installation quality by reducing cut or break errors or defects, for example. The stowed configuration (FIGS. 2 and 4) also allows a continuous portion of the gap 6 to be available/accessible for sealing between the fenestration unit 10 and the opening 4 in the building 2. For example, the stowed configuration (FIGS. 2 and 4) can help allow seal system 8 to be continuously applied in the continuous portion of the gap 6 (e.g., on the interior side of the shimming assemblies 30 in the stowed configuration) without being interrupted by the shimming assemblies 30 otherwise projecting toward the interior side 14 from between the fenestration unit 10 and the opening 4 in the building 2.

As previously indicated, and shown in FIGS. 1-5, there may be a plurality of shimming assemblies 30 coupled (e.g., pivotably or rotatably coupled) on at least one of the frame members of the plurality of frame members 25 at various locations around the frame 12 of the fenestration unit 10. In one embodiment, one of the shimming assemblies 30 may be located on at least one of the sill 26, the first jamb 20, and the second jamb 22. There may be a plurality of shimming assemblies 30 on at least one of the sill 26, the first jamb 20, and the second jamb 22. In other embodiments, the shimming assemblies 30 may be located in each of the four corners of the frame 12. Still, other embodiments may be contemplated in which the location of and number of shimming assemblies 30 coupled (e.g., pivotably or rotatably coupled) to the frame 12 fenestration unit 10 varies depending on the application. As shown in FIG. 3, there may be one of the shimming assemblies 30 on the first jamb 20 toward the sill 26 and another one of the shimming assemblies 30 on the first jamb 20 at an intermediate position between the sill 26 and the head 24. A similar set of the shimming assemblies 30 may be on the second jamb 22. Finally, a pair of the shimming assemblies 30 may be positioned on the sill 26.

FIG. 4 is a bottom view of the sill 26 of the fenestration unit 10 of FIG. 1 with the plurality of shimming assemblies 30 in the stowed configuration, in accordance with some embodiments. The plurality of shimming assemblies 30 may be positioned in the stowed configuration (FIGS. 2 and 4) such that the plurality of shimming assemblies 30 do not project beyond the frame 12 and the building opening 4 beyond an interior plane of the fenestration unit 10. In other words, the plurality of shimming assemblies 30 do not project beyond the intermediate portion 28 of the fenestration unit 10 at the perimeter 13 of the fenestration unit 10. In the stowed configuration (FIGS. 2 and 4), the shimming assembly 30 is located within the gap 6 between the fenestration unit 10 and the opening 4 in the building 2. In some embodiments, when in the stowed configuration (FIGS. 2 and 4), the shimming assembly 30 may extend substantially parallel to the frame member 20, 22, 24, 26 of which the shimming assembly 30 is coupled (e.g., pivotably or rotatably coupled). In some embodiments, the shimming assembly 30 is substantially parallel to the intermediate portion 28 in the stowed configuration (FIGS. 2 and 4). Due to the stowed configuration (FIGS. 2 and 4) of the shimming assembly 30, the shimming assembly 30 may not need to be cut off during installation. Instead, the shimming assembly 30 can be stowed along the intermediate portion 28 of the frame 12. As previously mentioned, the stowed configuration (FIGS. 2 and 4) also may allow the gap 6 between the fenestration unit 10 and the opening 4 in the building 2 to be continuous.

Figure 5:
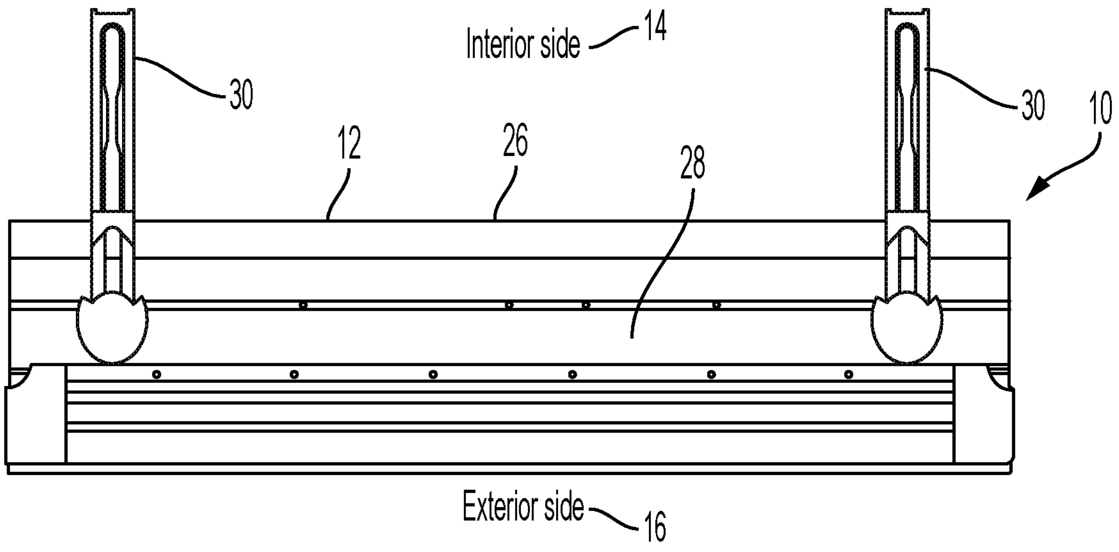
FIG. 5 is a bottom view of the sill of the fenestration unit of FIG. 1 with a plurality of shimming assemblies shown in the active configuration, in accordance with some embodiments.

FIG. 5 is a bottom view of the sill 26 of the fenestration unit 10 of FIG. 1 with the plurality of shimming assemblies 30 in the active configuration, in accordance with some embodiments. The plurality of shimming assemblies 30 may be positioned in the active configuration (FIGS. 3 and 5) such that the plurality of shimming assemblies 30 project outwardly from between the frame and the building opening beyond an interior plane of the fenestration unit. In other words, the plurality of shimming assemblies 30 project beyond the intermediate portion 28 of the fenestration unit 10 at the perimeter 13 of the fenestration unit 10. In some embodiments, when in the active configuration (FIGS. 3 and 5), the shimming assembly 30 may be substantially perpendicular to the frame member 20, 22, 24, 26 of which the shimming assembly 30 is coupled to (e.g., pivotably or rotatably coupled). In some embodiments, the shimming assembly 30 is substantially perpendicular to the intermediate portion 28 in the active configuration (FIGS. 3 and 5).

In FIGS. 4 and 5, each shimming assembly 30 is shown to be coupled (e.g., pivotably or rotatably coupled) to the sill 26. However, each shimming assembly 30 may be coupled to any one of the frame members in the plurality of frame members 25.

In some embodiments, the shimming assembly 30 is coupled (e.g., pivotably or rotatably coupled) to the fenestration unit 10 at a manufacturing location prior to shipping out from the manufacturing location. In some embodiments, the shimming assembly 30 may be in the stowed configuration (FIGS. 2 and 4) when shipped out from the manufacturing location such that the fenestration unit 10 is received with shimming assemblies 30 in the stowed configuration (FIGS. 2 and 4). In other embodiments, the shimming assembly 30 may be in the active configuration (FIGS. 3 and 5) when shipped out from the manufacturing location such that the fenestration unit 10 is received with shimming assemblies 30 in the active configuration (FIGS. 3 and 5). In other embodiments, each shimming assembly 30 may be coupled (e.g., pivotably or rotatably coupled) to the fenestration unit 10 by an installer after the fenestration unit 10 is shipped out from the manufacturing location.

Figure 6:
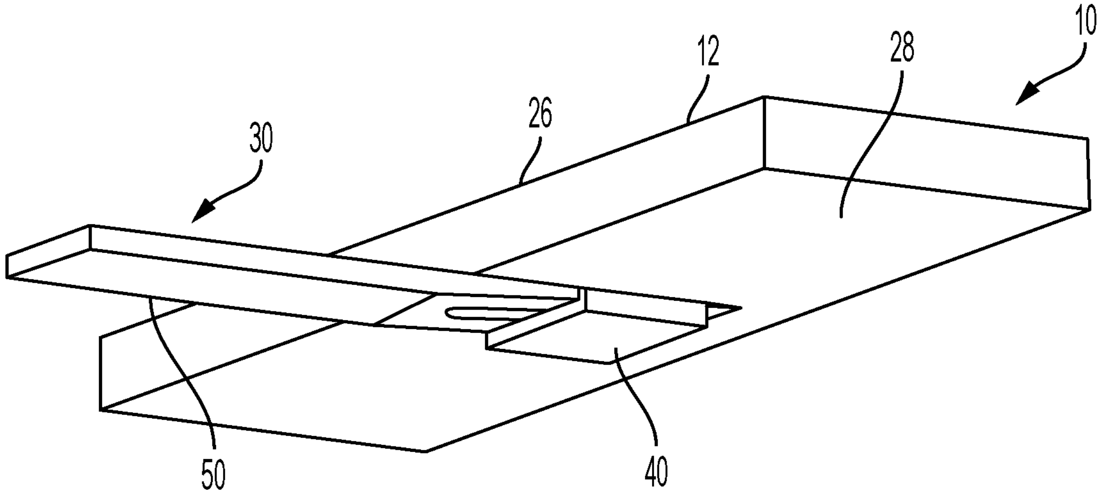
FIG. 6 is an illustration of an example shimming assembly design, including a portion of the frame member of the fenestration unit frame assembly, in accordance with some embodiments.

FIG. 6 is an illustration of an example shimming assembly design, including a portion of the frame member of the fenestration unit frame assembly 12, in accordance with some embodiments. The frame member is shown generally in FIG. 6 and may be any of the frame members of the plurality of frame members of the frame assembly 12, including but not limited, the sill 26 (e.g., sill 26 of FIG. 5). The shimming assembly 30 may be rotatably coupled to the frame member (e.g., sill 26) such that the shimming assembly 30 is rotatable between the active configuration (FIGS. 3 and 5) in which the shimming assembly 30 extends away from the frame member and a stowed configuration (FIGS. 2 and 4), in which the shimming assembly extends along the frame member. The direction, or plane, of rotation may be parallel to a plane of the frame member defined by the length and width of the frame member. In FIG. 6, the shimming assembly 30 is shown in the active configuration. As shown in FIG. 6, the shimming assembly 30 includes a base 40 and a slider 50.

Figure 7:
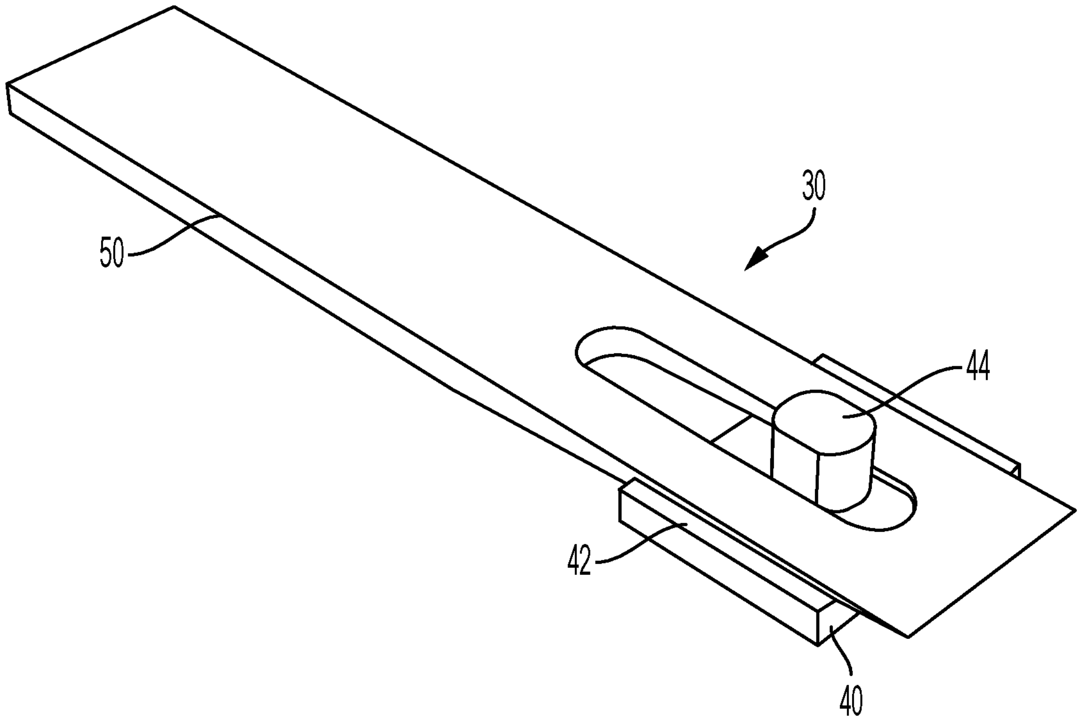
FIG. 7 is an isometric view of the shimming assembly of FIG. 6, in accordance with some embodiments.

FIG. 7 is an isometric view of the shimming assembly of FIG. 6, in accordance with some embodiments. As shown, the base 40 defines a raised contact surface 42 and a pivot pin 44. The pivot pin 44 may define a rotation axis of the shimming assembly 30. The base 40 may also include a base inclined surface (e.g., the base inclined surface 43 of FIGS. 8A-8B). The slider 50 may be slidably coupled to the base 40 such that the slider 50 is slidable along the base inclined surface in response to a user-applied sliding force. The user applied sliding force may be substantially similar to the user applied force as described with respect to FIG. 3 such that the force is applied in a direction from the interior side 14 (see FIG. 3) of the fenestration unit 10 toward the exterior side 16 (see FIG. 3) of the fenestration unit 10. The user applied sliding force may be a pushing force. The slider 50 may also be coupled to the base 40 such that the slider 50 is rotatable about the rotation axis defined by the pivot pin 44. In some embodiments, both the slider 50 and the base 40 may be rotatable. The rotation axis may be defined through a center of the pivot pin 44 and may be along a central (e.g., vertical) axis of the pivot pin 44. The slider 50 and/or the base 40 may be rotatable about the rotation axis in response to a user-applied torque. The user-applied torque may be a rotational force applied about a longitudinal axis of the pivot pin 44. The user-applied torque may transition the shimming assembly 30 from the active configuration (FIGS. 3 and 5) to the stowed configuration (FIGS. 2 and 4). The movement of the shimming assembly 30 and the user-applied forces will be further described subsequently in more detail.

Figure 8A:
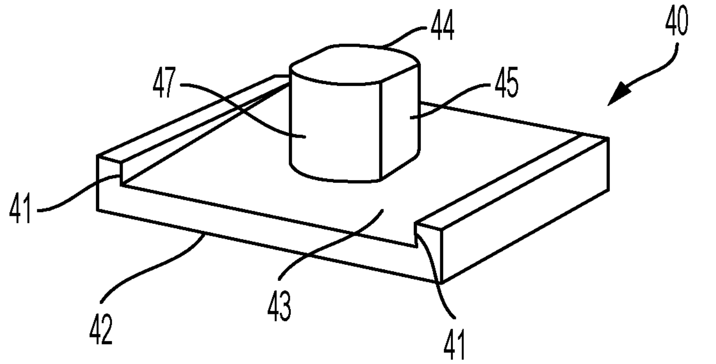
FIGS. 8A-8B are an isometric view and side view, respectively, of a base isolated from the shimming assembly of FIG. 7, in accordance with some embodiments.
Figure 8B:
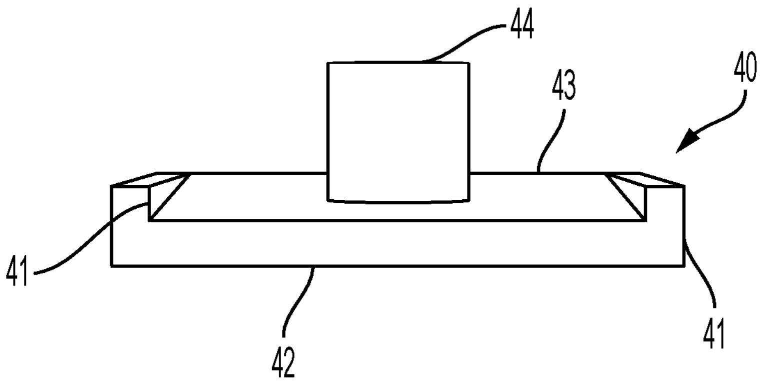

FIGS. 8A and 8B are an isometric view and side view, respectively, of the base 40 isolated from the shimming assembly 30 of FIG. 7, in accordance with some embodiments. In some embodiments, the raised contact surface 42 of the base 40 is flat. In other embodiments, (e.g., the embodiment in FIGS. 12A-12C) the raised contact surface 42 is dome-shaped. In some embodiments, the base inclined surface 43 defines a groove 41, or set of grooves 41, which are operable to engage the slider 50 when the slider 50 slides along the base 40. The groove may include raised surfaces to guide the slider 50 along the base inclined portion 43. In some embodiments, the pivot pin 44 is positioned along a longitudinal centerline of the base 40. The pivot pin 44 may include a pivot pin flat edge 45 and a pivot pin rounded edge 47. The pivot pin flat edge 45 and the pivot pin rounded edge 47 may be operable to engage a slot of the slider 50 (e.g., the slot 55 of FIGS. 9A and 9B) where the slot receives the pivot pin 44 to slidably couple the slider 50 and the base 40. The slot may receive the pivot pin 44 such that the pivot pin 44 is free to slide within the slot. In this embodiment, the pivot pin 44 may also engage with the edges of the slot of the slider such that the pivot pin 44 is inhibited from rotating within the slot of the slider 50. The pivot pin flat edge 45 and the pivot pin rounded edge 47 may engage the edges of the slot. Further details on the slot of the slider 50 are described subsequently in FIGS. 9A and 9B.

Figure 9A:
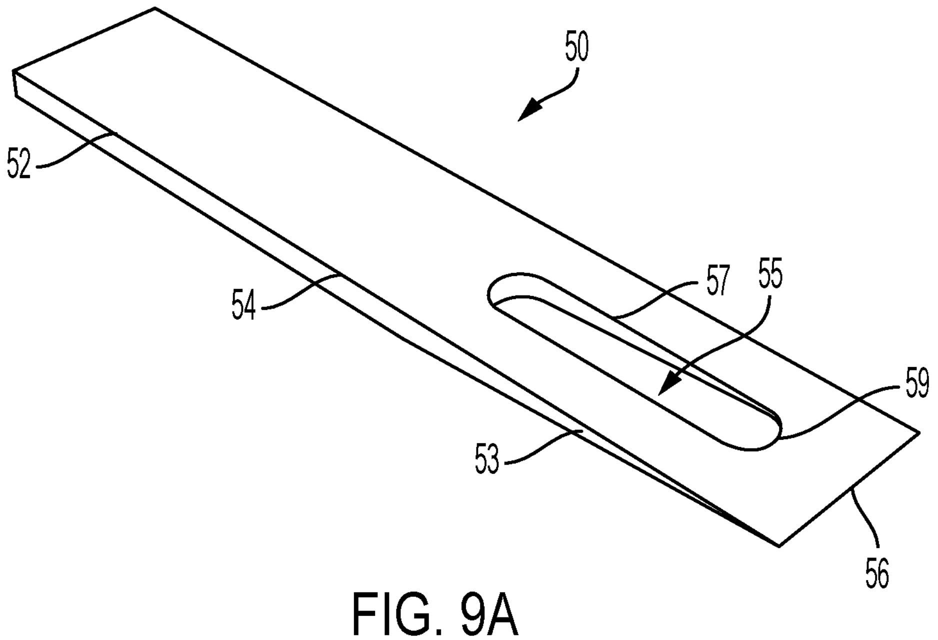
FIGS. 9A-9B are an isometric view and side view, respectively, of a slider isolated from the shimming assembly of FIG. 7, in accordance with some embodiments.
Figure 9B:
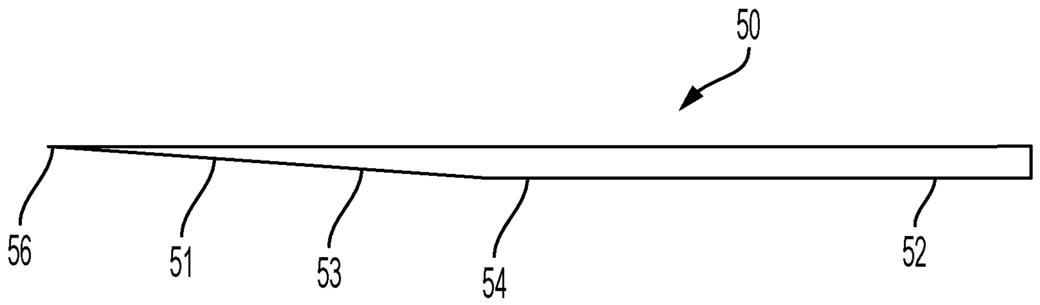

FIGS. 9A and 9B are an isometric view and side view, respectively, of the slider 50 isolated from the shimming assembly 30 of FIG. 7, in accordance with some embodiments. In some embodiments, the slider 50 includes a slider inclined surface 53 that is slidable along the base inclined surface 43. The slider inclined surface 53 and the base inclined surface 43 may engage in a complementary fit.

In some embodiments, the slider includes a leading edge 56 which is at the end of the slider inclined portion 53. The leading edge 56 may be a sharp point, although the leading edge 56 may be rounded or squared, for example, as desired. In some embodiments, the slider 50 may further include a handle portion 52, which may include and/or be defined by a flat portion 54 adjacent to the slider inclined surface 53. Regardless, in some embodiments, the handle portion 52 is associated with the slider 50, for example being coupled to the slider 50 or formed integrally with the slider 50, for example. As shown, the handle portion 52 of the slider 50 is operable to project outwardly from between the frame 12 and the building opening 4 when the shimming assembly 30 is in the active configuration (e.g., FIG. 7). The handle portion 52 is operable to receive the user-applied sliding force and the user-applied torque when in the active configuration. In other embodiments, the handle portion 52 may be associated with the base 40 instead of the slider 50, or in addition to the slider 50. When associated with the base 40, the handle portion 52 may still be operable to receive the user-applied sliding force and the user-applied torque when in the active configuration.

In some embodiments of the fenestration unit 10, where the frame assembly 12 is to be installed in a building opening 4, the shimming assembly 30 may be coupled to the frame assembly 12. When the shimming assembly 30 has the active configuration, the shimming assembly 30 projects more outwardly in a front-to-back direction from the frame assembly 12 and when the shimming assembly is in a stowed configuration, the shimming assembly 30 projects more along the frame assembly 12 (e.g., parallel to the length of the frame member to which the shimming assembly 30 is coupled). The active configuration may be defined by the handle portion 52 projecting outwardly from between the frame assembly 12 and the building opening 4 beyond an interior plane of the fenestration unit 10 (e.g., the intermediate portion 28). The stowed configuration may be defined by the handle portion 52 no longer projecting outwardly from between the frame assembly 12 and the building opening 4 and the handle portion 52 being positioned within the interior plane of the fenestration unit (e.g., the intermediate portion 28).

Further to FIGS. 9A-9B, the slider 50 may further include a slot 55 that receives the pivot pin 44 of the base 40 to slidably coupled the slider 50 and the base 40. The slot 55 may include a flat edge 57 and a rounded edge 59. The flat edge 57 and the rounded edge 59 may be operable to engage the pivot pin 44. The flat edge 57 and the rounded edge 59 may be complementary to the flat edge 45 and the rounded edge 47, respectfully, of the pivot pin 44. In some embodiments, where the base 40 includes the grooves 41, the slider inclined surface 53 may define, or form, a tongue 51 that is engaged with the groove 41 of the base 40. The tongue 51 and groove 41 may fit together in a complementary fit.

Figure 14A:
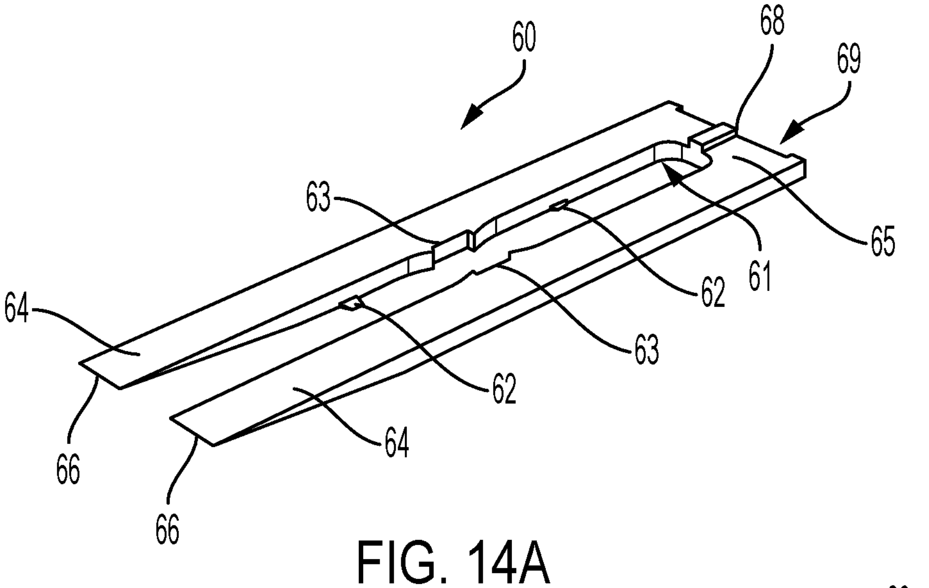
FIGS. 14A, 14B, and 14C are an isometric view, a top view, and a side view, respectively, of a spacer isolated from the shimming assembly, in accordance with some embodiments.
Figure 14B:
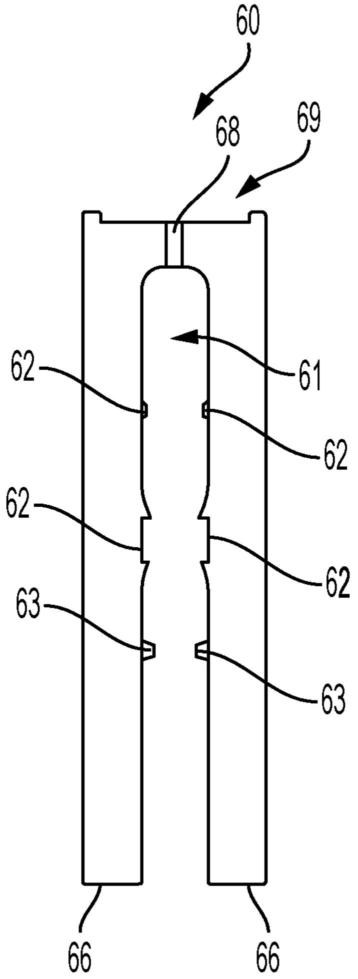
Figure 14C:
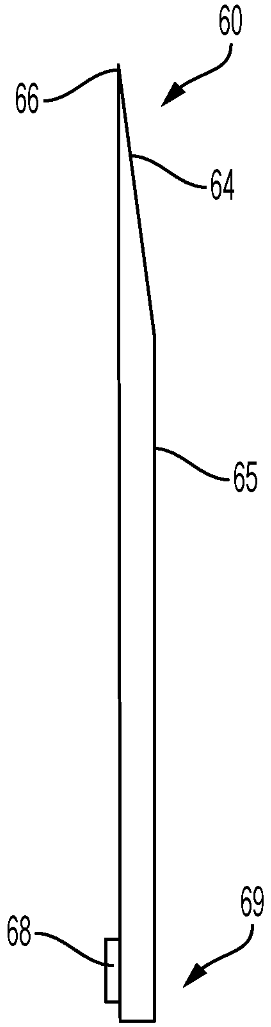

The shimming assembly 30 may further include a spacer (not shown, but see, e.g., the spacer 60 of FIGS. 14A-14C). Such a spacer may be receivable between the slider 50 and the base 40. Similarly, to the example of FIGS. 14A-14C, the spacer may include a spacer inclined portion (e.g., spacer inclined portion 64 of FIGS. 14A-14C) that is operable to slidably engage the base inclined surface 43. The spacer inclined portion may be operable to engage the pivot pin 44 of the base 40. Such a spacer may be coupled to the slider 50 by a break off connection (e.g., break off feature 69 of FIGS. 14A-14C) such that the spacer is configured to be broken off from the slider 50 via a break off force or impact force (e.g., a hammer) without substantially damaging the slider 50.

Figure 10:
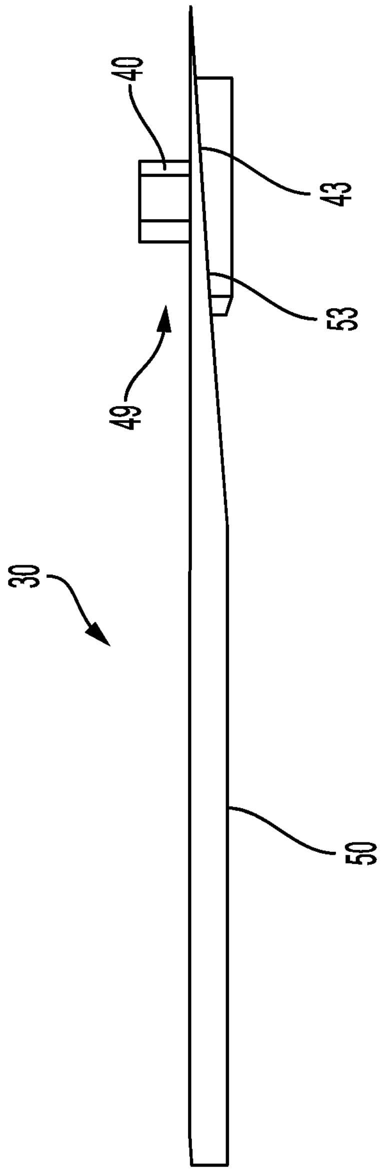
FIG. 10 is a side view of the shimming assembly of FIG. 6 with the base inclined surface engaged with the slider inclined surface, in accordance with some embodiments.

FIG. 10 is a side view of the shimming assembly 30 of FIG. 6 with the base inclined surface 43 engaged with the slider inclined surface 53, in accordance with some embodiments. In this embodiment, the slider inclined surface 53 and the base inclined surface 43 engage in a complementary fit. The slider inclined surface 53 and the base inclined surface 43 may be configured with a low coefficient of friction such that a relatively low amount of force needs to be applied in order to slide the slider inclined portion 53 against the base inclined portion 43. This may be done by using low-friction materials, including but not limited to plastics such as polypropylene (PP) or a plastic-wood composite material. The two may also be formed of different materials, or at least the contact surfaces between the two may be formed of different materials, to help reduce friction. Regardless, a lower coefficient of friction may help a user to apply a manual, or hand-force to the shimming assembly 30 instead of using a tool (e.g., a hammer) to apply the force. As shown in FIG. 10, in some embodiments, the slider inclined portion 53 and the base inclined portion 43 fit together as a wedge 49, or in a wedge arrangement. In some embodiments, the wedge 49 may be formed when the slider inclined portion 53 and the base inclined portion 43 are both inclined planar surfaces.

In some embodiments, when the slider 50 is pushed into the base 40 by the user-applied force (e.g., the user-applied sliding force), the wedge 49 is enlarged or increased in overall thickness, or height, such that there is a wedging effect that moves the base 40 away from the frame assembly 12. In turn, the slider 50 may be engage, or forcibly contact with the frame assembly 12 as it slides over the base 40 (e.g., as shown in FIG. 10). As the slider 50 engages, or forcibly contacts the frame assembly 12, the fenestration unit 10 is translated (e.g., lifted upwardly or jam-jacked) within the building opening 4. Such action may be utilized to help level and/or center the fenestration unit 10 within the building opening 4.

Figure 11A:
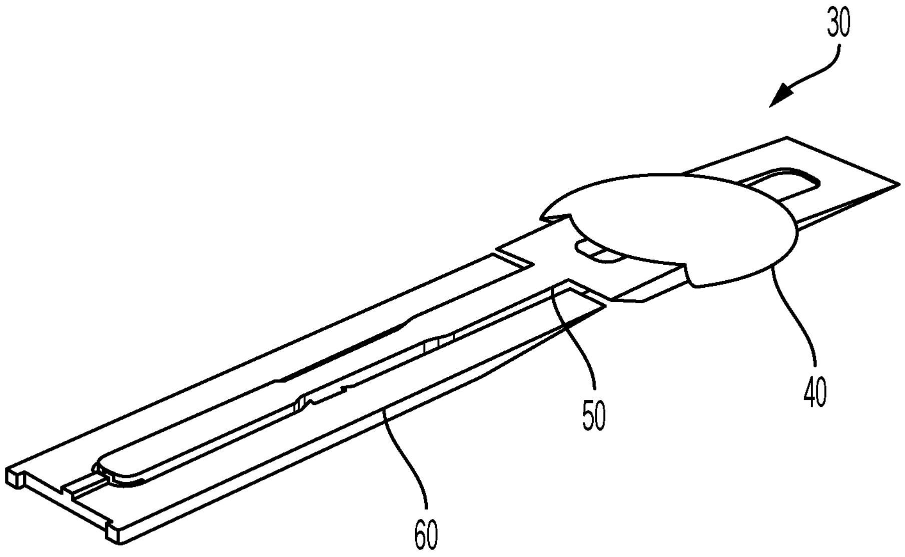
FIGS. 11A, 11B, and 11C are an isometric view, a top view, and a bottom view, respectively, of an example shimming assembly design, such as that shown in FIGS. 1 to 5, in accordance with some embodiments.
Figure 11B:
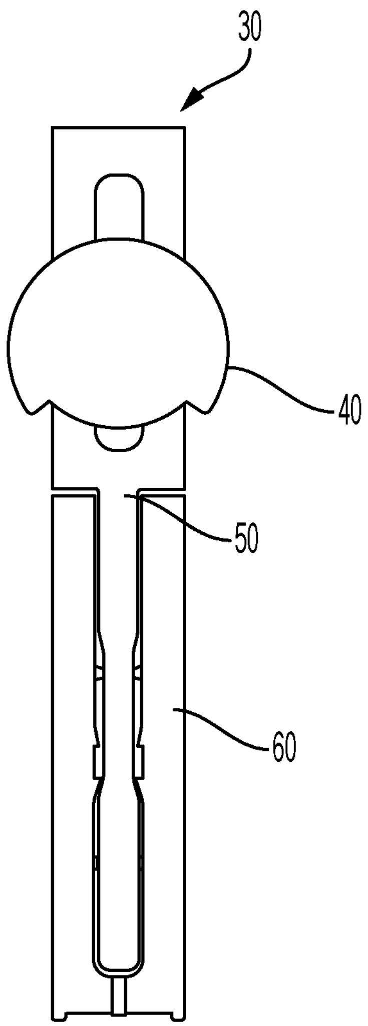
Figure 11C:
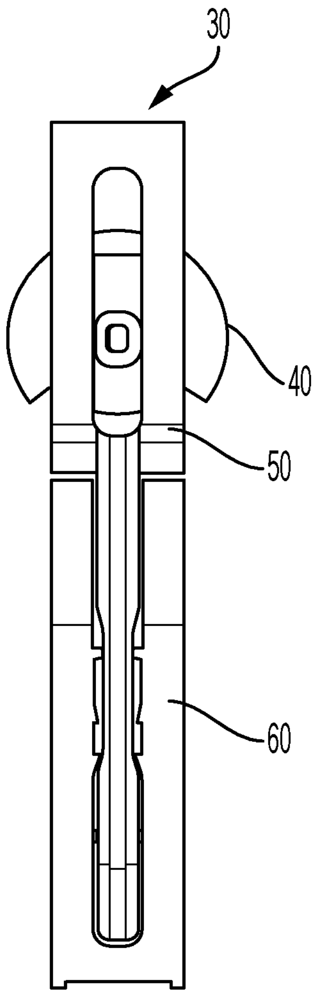

FIGS. 11A-11C are an isometric view, a top view, and a bottom view, respectively, an example shimming assembly design, such as that shown in FIGS. 1 to 5, in accordance with some embodiments. In some embodiments, the shimming assembly 30 of FIGS. 11A-11C may operate substantially similarly to the shimming assembly 30 of FIG. 7. As such, similar features are called out with similar names and reference numbers between the afore-mentioned embodiments. As shown in FIGS. 11A-11C, the shimming assembly 30 includes the base 40 and the slider 50 engaged with each other. The base 40 and the slider 50 may be substantially the same as the base 40 and the slider 50 of FIGS. 6-10. The slider 50 is engaged with or coupled to the base 40 such that the slider 50 is slidable relative to the base 40 by a user applied force between the fenestration unit 10 and the opening 4 in the building 2 in which the fenestration unit 10 is to be installed. This may occur when the shimming assembly 30 is in the active configuration (FIGS. 3 and 5). The shimming assembly 30 may optionally include a spacer 60.

Figure 12A:
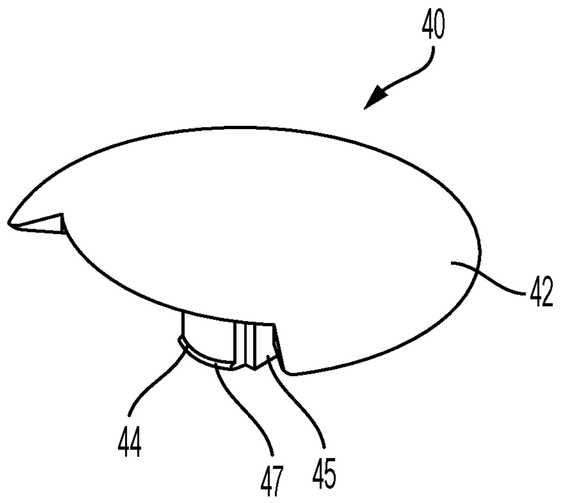
FIGS. 12A, 12B, and 12C are an isometric view, a top view, and a bottom view, respectively, of a base isolated from the shimming assembly of FIGS. 11A-11C, in accordance with some embodiments.
Figure 12B:
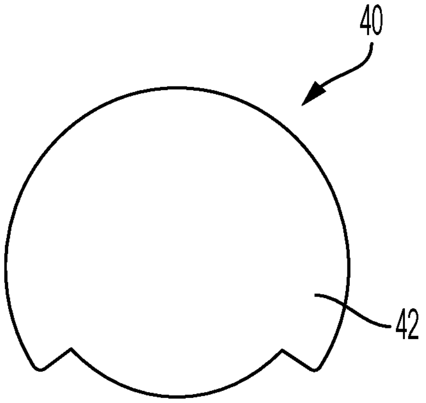
Figure 12C:
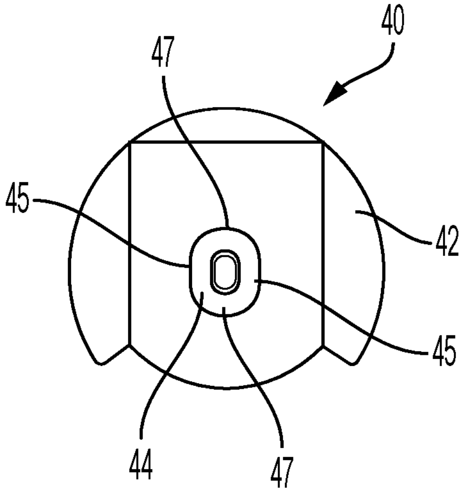

FIGS. 12A-12C are an isometric view, a top view, and a bottom view, respectively, of the base 40 isolated from the shimming assembly 30 of FIGS. 11A-11C, in accordance with some embodiments. In some embodiments, the base 40 of FIGS. 12A-12C may be substantially similar in operation to the base 40 of FIGS. 8A-8B. The base 40 defines the raised contact surface 42 that is operable to engage with the opening 4 in the building 2 in which the fenestration unit 10 is to be installed. In some embodiments, the raised contact surface 42 surface is dome-shaped. The base 40 further includes a pivot pin 44. In some embodiments, the pivot pin 44 may be secured to one of the frame members in the plurality of frame members 25. In some embodiments, the base 40 is configured to be rotatably coupled to the frame 12 of the fenestration unit 10 such that the base 40 is rotatable when the shimming assembly 30 is transitioned from the active configuration (FIGS. 3 and 5) to the stowed configuration (FIGS. 2 and 4). The pivot pin 44 may include a flat edge 45 and a rounded edge 47 that are configured to engage with the slider 50 and/or the spacer 60. The flat edge 45 may be extended outwardly from the pivot pin 44.

Figure 13A:
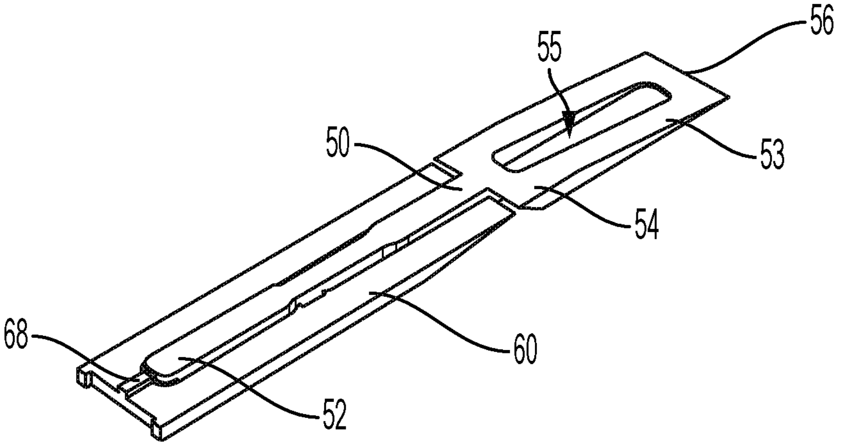
FIGS. 13A, 13B, and 13C are an isometric view, a top view, and a side view, respectively, of a slider and a spacer isolated from the base of the shimming assembly of FIGS. 11A-11C, in accordance with some embodiments.
Figure 13B:
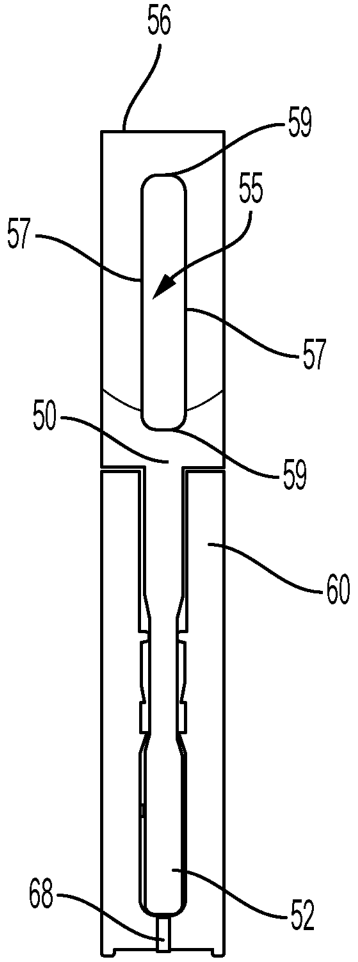
Figure 13C:
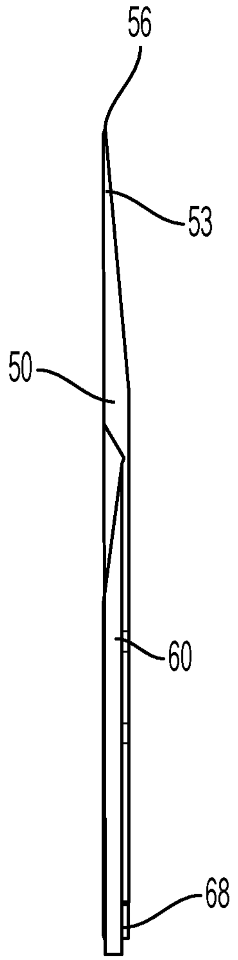

FIGS. 13A-13C are an isometric view, a top view, and a side view, respectively, of the slider 50 and a spacer 60 isolated from the base 40 of the shimming assembly 30 of FIGS. 11A-11C, in accordance with some embodiments. In some embodiments, the slider 50 of FIGS. 13A-13C may be substantially similar in operation to the slider 50 of FIGS. 9A-9B. FIGS. 13A-13C also show the slider 60, which is further described with respect to FIGS. 9A-9C.

Figure 17:
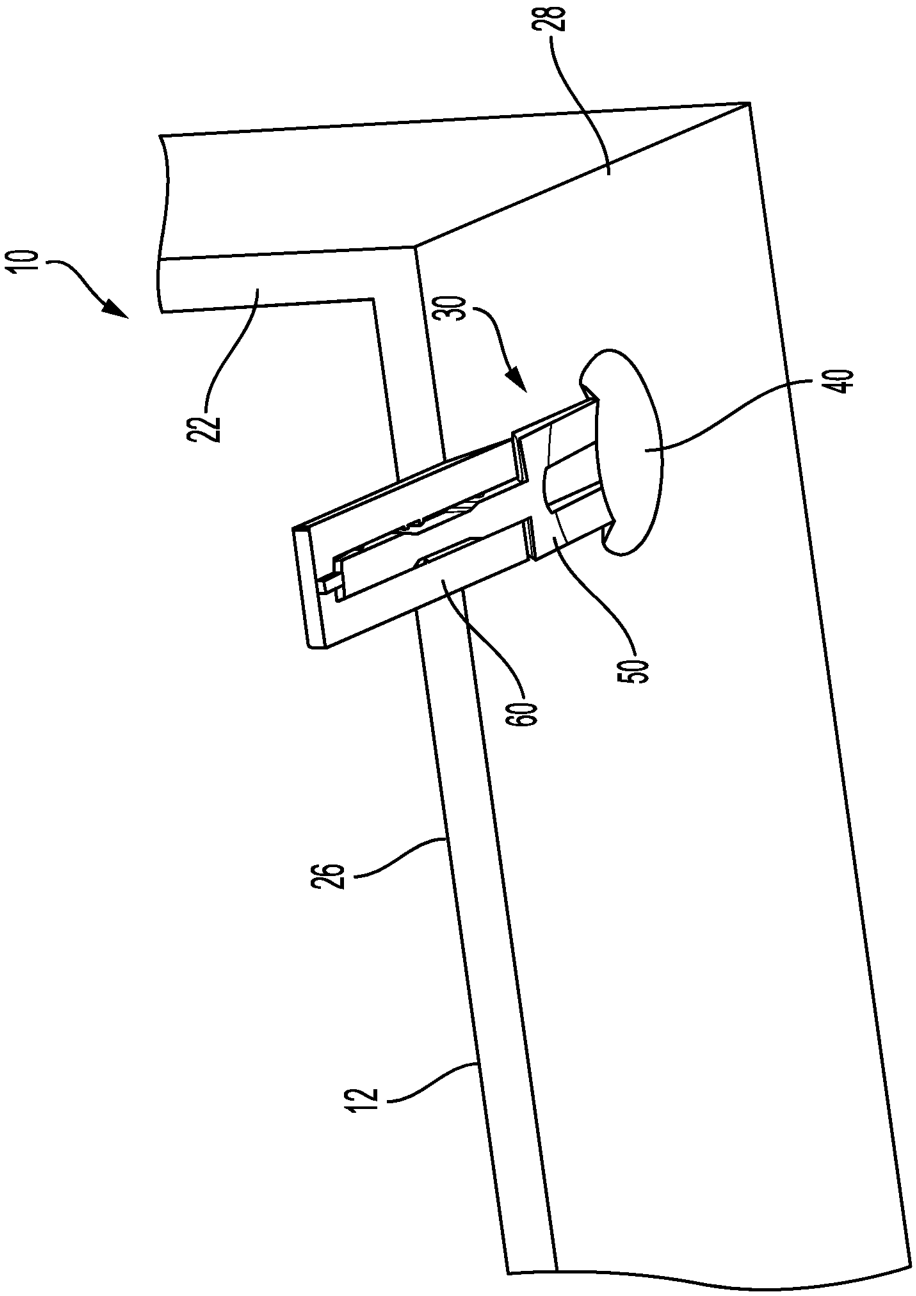
FIGS. 17, 18, and 19 are schematic representations of the shimming assembly coupled to the sill of the frame and engaged in the shimming action, in accordance with some embodiments.
Figure 18:
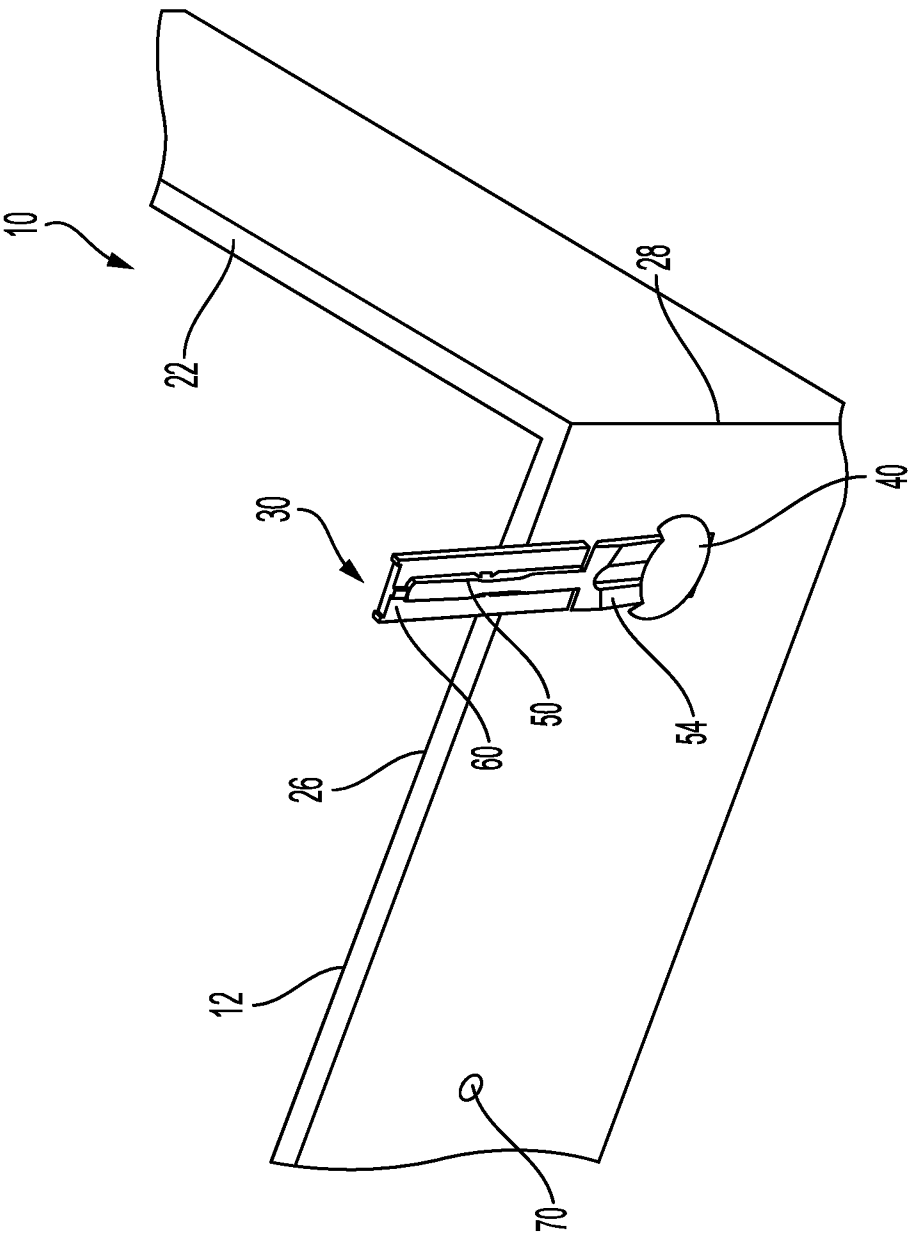
Figure 19:
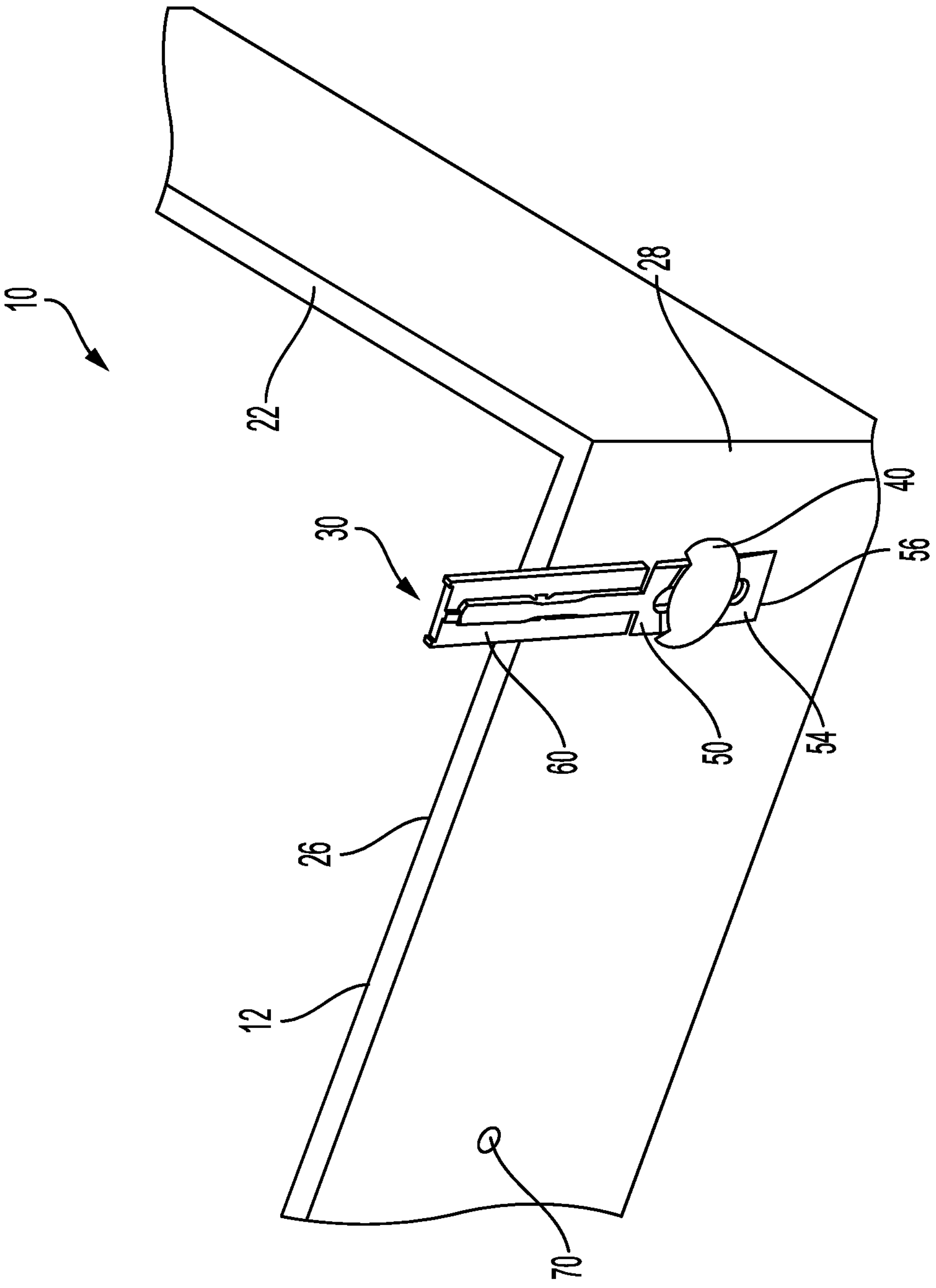

The slider 50 includes a handle portion 52 associated with slider 50 where the handle portion 52 is operable to project outwardly from between the frame assembly 12 and the opening 4 in the building 2 when the shimming assembly 30 is in the active configuration (FIGS. 3 and 5). In other embodiments, the handle portion 52 may be associated with the base 40 instead of, or in addition to, the slider 50. The handle portion 52 is operable be transitioned to the stowed configuration (FIGS. 2 and 4) in which the handle portion 52 does not project outwardly from between the frame assembly 12 and the opening 4 in the building 2. In the stowed configuration, the handle portion 52 may be received between the frame assembly 12 and the opening 4 in the building 2. In some embodiments, the shimming assembly 30 may be received along the intermediate portion 28 (FIGS. 4 and 5) of the frame assembly 12 when transitioned to the stowed configuration (FIGS. 2 and 4). In some embodiments, when in the active configuration (FIGS. 3 and 5), the handle portion 52 may project substantially perpendicular to the frame member 20, 22, 24, 26 of which the shimming assembly 30 is coupled to (e.g., pivotably or rotatably coupled). In some embodiments, when in the stowed configuration (FIGS. 2 and 4), the handle portion 52 may extend substantially parallel to the frame member 20, 22, 24, 26 of which the shimming assembly 30 is coupled to (e.g., pivotably or rotatably coupled). The handle portion 52 may be operable to stay projecting from between the fenestration unit 10 and the opening 4 in the building 2 after the shimming assembly 30 completes the shimming action (FIGS. 17-19). By having the handle portion 52 remain projecting, the shimming assembly 30 can be transitioned to the stowed position by the user applied torque.

In some embodiments, the shimming assembly 30 is rotatably coupled to the frame member (e.g., sill 26) such that the shimming assembly 30 is rotatable between an active configuration in which the shimming assembly extends away from the frame member and a stowed configuration, in which the shimming assembly 30 extends along the frame member. The pivot pin 44 of the base 40 may be coupled to the frame assembly 12 at the frame member. The slider 50 may be slidably coupled to the base 40 such that sliding the slider 50 relative to the base 40 increases an overall thickness of the shimming assembly 30. Increasing the thickness of the shimming assembly 30 may be done via the aforementioned wedging effect wherein the base 40 moves away from the frame assembly 12 and the slider 50 is put into contact with the frame assembly 12 to level and/or center, for example, the fenestration unit 10 within the building opening 4.

As described in association with the example above, the handle portion 52 associated with the slider 50 is operable to receive a user-applied sliding force on the slider 50 to increase the overall thickness of the shimming assembly 30. The user-applied sliding force may be applied with the shimming assembly 30 is in the active configuration where the active configuration of the shimming assembly 30 may be defined by the handle portion 52 projecting outwardly from between the frame and the building opening. In the active configuration, the handle portion may receive the user-applied force. This allows the user to be in control of leveling and/or centering, or otherwise manipulating the fenestration unit 10 through the application of the user-applied sliding force. In some examples, the forces applied by the shimming assemblies 30 may assist in securing the fenestration unit 10 in place. Regardless, as described, the shimming assembly 30 may be configured to increase in thickness by sliding the slider 50 such that a translation force (e.g., an upward force) is applied to the fenestration unit 10, and the fenestration unit 10 is translated (e.g., upward) within the building opening 4. The relative thickness of the shimming assembly 30 and the slider 50 are further described subsequently with respect to FIGS. 22-28.

Figure 22:
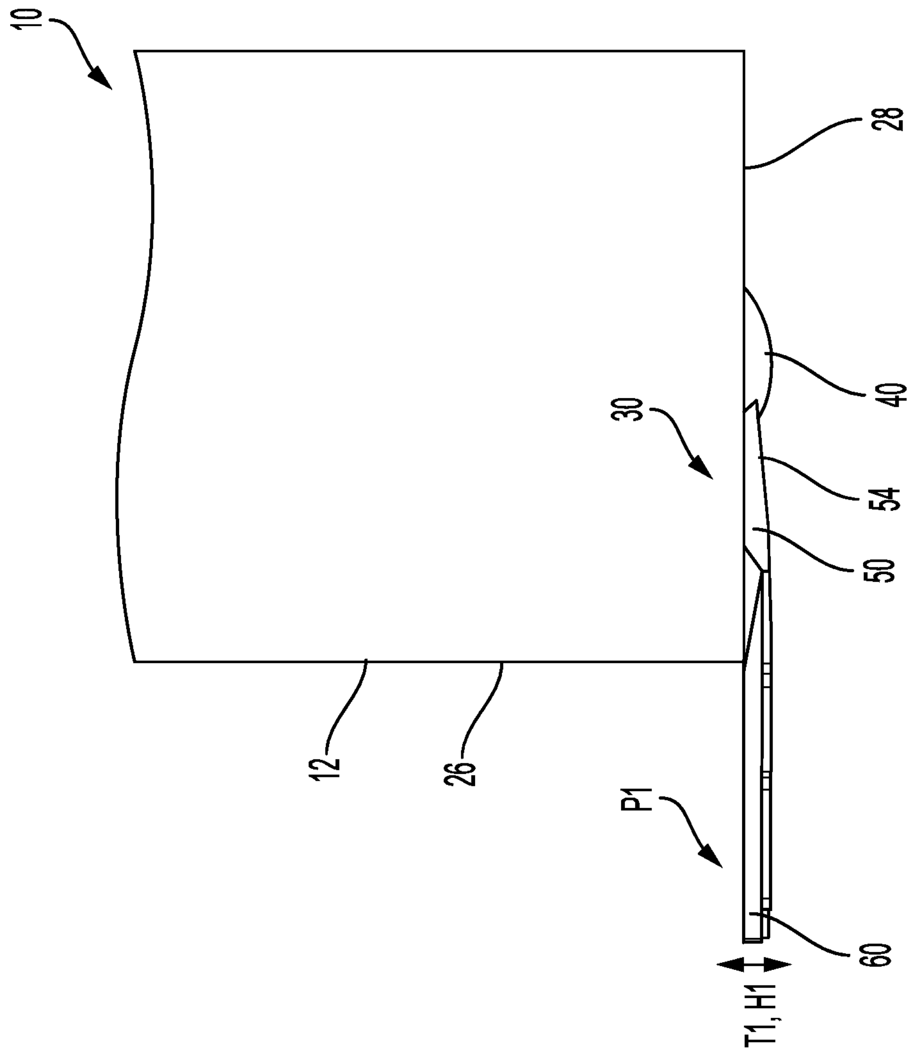
FIG. 22 is a schematic side-view representation of the shimming assembly in the active configuration, in accordance with some embodiments.
Figure 23:
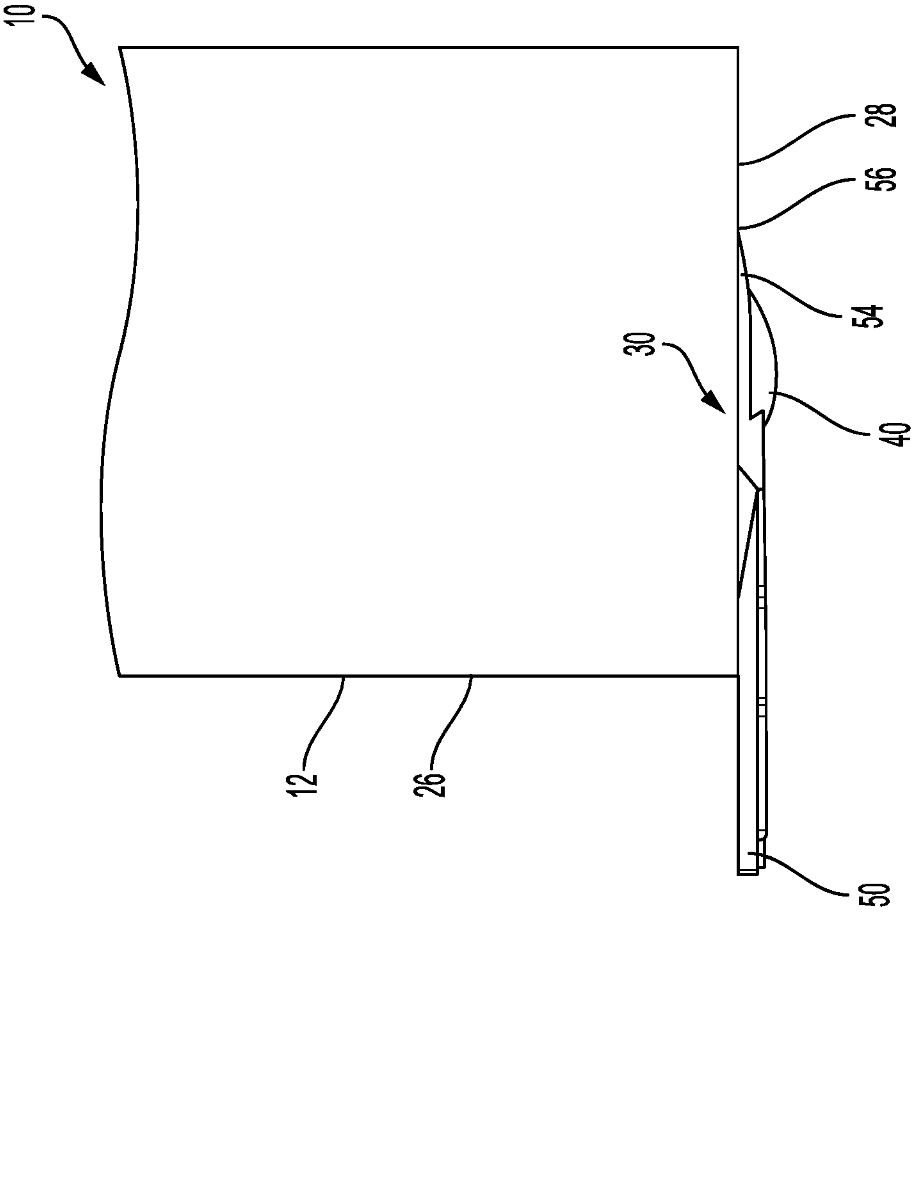
FIGS. 23 and 24 are schematic side-view representations of the shimming assembly engaged in the shimming action, in accordance with some embodiments.
Figure 24:
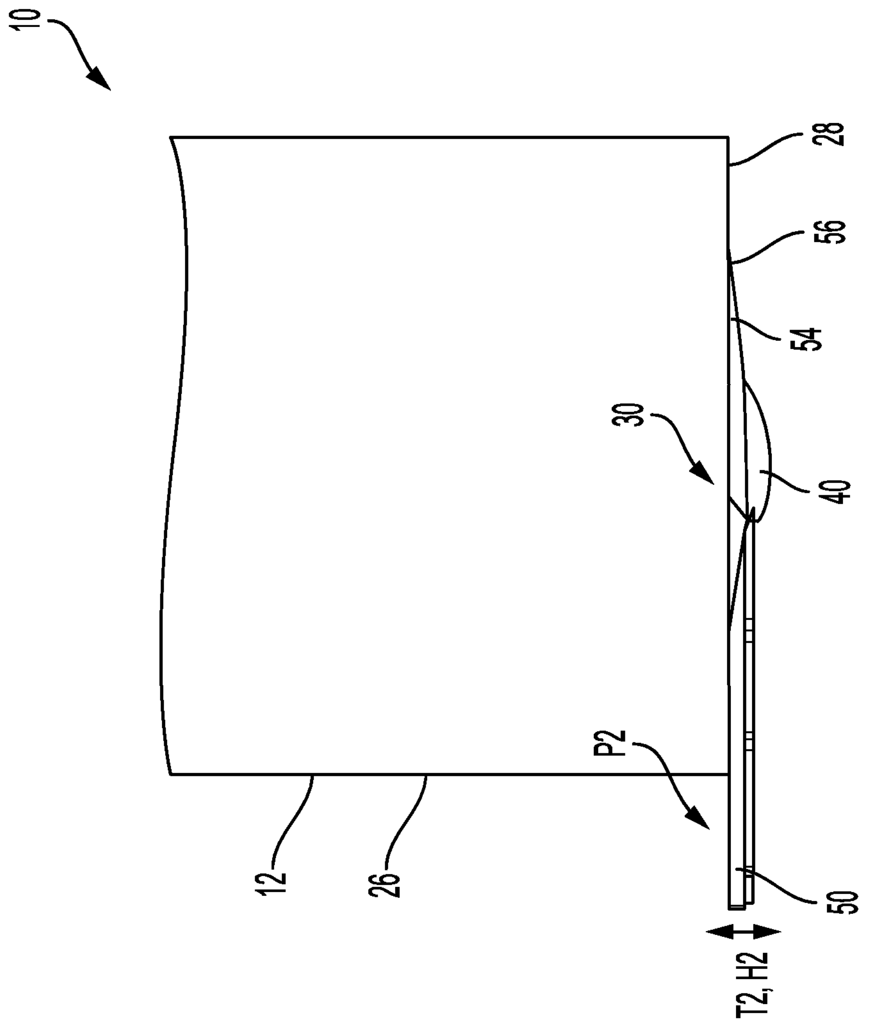

The slider 50 may include a slider inclined surface 53 that increases in thickness from a first thickness T1 (FIGS. 22-24) to a second thickness T2 (FIGS. 22-24). The slider 50 is slidable against the base 40 from a first position P1 (FIGS. 22-24) in which the first thickness T1 defines a first overall height H1 (FIGS. 22-24) of the shimming assembly 30 and a second position P2 (FIGS. 22-24) in which the second thickness T2 defines a second overall height H2 (FIGS. 22-24) of the shimming assembly 30. The slider 50 may also include a flat portion 54 adjacent to the slider inclined surface 53. The handle portion 52 may connect and extend outwardly from the flat portion 54. The slider 50 may also include a leading edge 56 at an end of the slider inclined surface 53. The leading edge 56 may come to a point, as illustrated in FIG. 13*c*, which may be a sharp point.

The slider 50 may also include a slot 55 that extends along the flat portion 54 and the slider inclined surface 53. The slot 55 may include a flat edge 57 and a rounded edge 59. The flat edge 57 and the rounded edge 59 may be operable to engage the pivot pin 44 during the shimming action (FIGS. 17-19). The flat edge 57 and the rounded edge 59 may be complementary to the flat edge 45 and the rounded edge 47, respectfully, of the pivot pin 44.

In some embodiments, the whole shimming assembly 30 (i.e., including the base 40, the slider 50, and the optional spacer 60) is configurated to rotate when the user applied torque is applied to the handle portion 52. The base 40 may be rotatably coupled to the frame assembly 12 and may include the base inclined surface 43. The slider 50 may be slidably coupled to the base 40 such that the slider 50 and base 40 are operable to rotate together in response to a user-applied torque to the slider 50 and the base 40. The handle portion 52 may be associated with at least one of the base 40 and the slider 50 where the handle portion 52 may be operable to receive the user-applied torque to rotate the base 40 and the slider 50 to transition the shimming assembly 30 from the active configuration to the stowed configuration. The slider 50 and the base 40 may be operable to rotate together by having the slot 55 of the slider 50 engage pivot pin 44. The whole shimming assembly 30 may be configured to rotate about the pivot pin 44 due, in part, to the complementary shape of the slot 55 of the slider 50 and the pivot pin 44 of the base 40. It is also contemplated that the base 40 stays stationary upon the user applied torque on the handle portion 52 and the slider 50 is configured to rotate about the base 40. It is also contemplated that the spacer 60 may rotate about the base 40, or the pivot pin 44 of the base 40, due to an engagement of the spacer 60 and the slider 50.

In some embodiments, the base 40 is rotatably coupled to the frame 12 or rotatably coupled to one of the frame members in the plurality of frame members 25 of frame 12. In some embodiments, the base 40 includes the pivot pin 44 that can be secured to one of the frame members of the plurality of frame members 25. Further to this embodiment, the base 40 may be rotatable about the pivot pin 44 in transitioning from the active configuration (FIGS. 3 and 5) to the stowed configuration (FIGS. 2 and 4). The pivot pin 44 may include any one of a screw, a nail, a custom fastener, or the like. The pivot pin 44 may create a pin connection between the base 40 and the frame member in the plurality of frame members 25 in which the base 40 is rotatably coupled to. Further to this embodiment, the frame member of the plurality of frame members 25 may have a receiving pocket 70 and the pivot pin 44 may be mounted in the receiving pocket 70. The receiving pocket may include a hole 70 (seen in FIG. 18-21) configured to receive the pivot pin 44 such that the pivot pin 44 is mounted in the hole 70. The hole 70 may be drilled into one of the frame members in the plurality of frame members 25. The hole 70 may be about 0.500" inches in diameter. Other shapes for the hole 70 are also contemplated.

In some embodiments, the shimming assembly 30 further comprises a spacer 60. FIGS. 14A-14C are an isometric view, a top view, and a side view, respectively, of the spacer 60 isolated from the shimming assembly 30, in accordance with some embodiments. The spacer 60 is configured to be receivable with the slider 50 to increase an overall height of the shimming assembly 30.

Further to FIGS. 14A-14C, the spacer 60 may include a central opening 61 that is operable to receive the pivot pin 44 of the base 40. The central opening 61 may define a plurality of catch features 62 that are configured to engage the pivot point 44 of the base 40 and/or the handle portion 52 of the slider 50, as further shown in FIG. 15*b*. The catch features 62 may include a depressed portion 63 that corresponds to the extended flat edge 45 of the pivot pin 44. The reverse configuration is also contemplated in which the pivot pin 44 has a depressed flat edge 45 and the catch features 62 have a corresponding extended portion 63.

The spacer 60 may include a spacer inclined portion 64 and a flat portion 65, which may be similar to the slider inclined surface 53 and the flat portion 54 of the slider 50, that is slidable against the slider 50. The spacer may also include a leading edge 66 at the end of the spacer inclined portion 64, which may be a sharp point, although the leading edge 66 may be rounded or squared, for example, as desired. The spacer 60 may be configured with two leading edges 66 on either side of the central opening 61 of the spacer 60.

Further to this embodiment, the spacer 60 may be coupled to the slider 50 by a break off connection 69 such that the spacer 60 is configured to be broken off from the shimming assembly 30 via a user applied break off force on the spacer 60 when the shimming assembly 30 is in the active configuration (FIGS. 3 and 5). The user applied break off force may be applied using a hammer, or the like. The break off connection 69 may be configured such that the spacer is configured to be broken off from the slider 50 via the user-applied break off force without substantially damaging the slider 50. The break off feature 69 may be located on the opposite end of the leading edge(s) 66 such that the break off feature 69 projects outwardly from between the fenestration unit 10 and the opening 4 in the building 2 in the active configuration (FIGS. 3 and 5). The spacer 60 may be broken off if the spacer 60 is not used in the shimming action (FIGS. 17-19). In other configurations, the spacer 60 may be operable to move to the stowed configuration (FIGS. 2 and 4) with the shimming assembly 30 such that it does not need to be broken off from the shimming assembly 30.

Figure 15A:
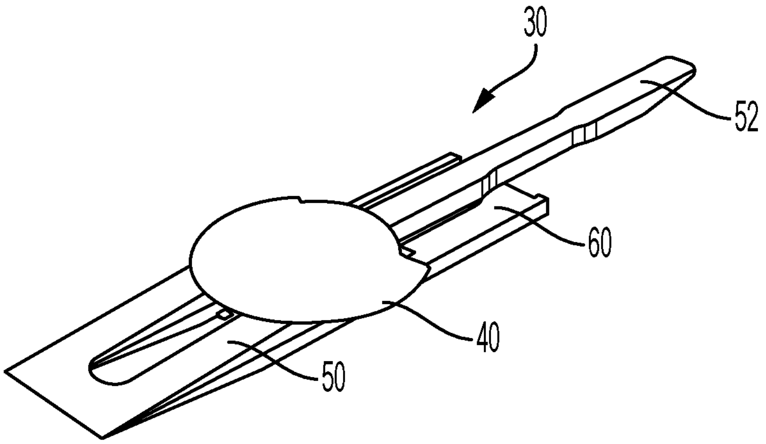
FIGS. 15A, 15B, and 15C are an isometric view, a bottom view, and a side view, respectively, of the shimming assembly in a shimming action, in accordance with some embodiments.
Figure 15B:
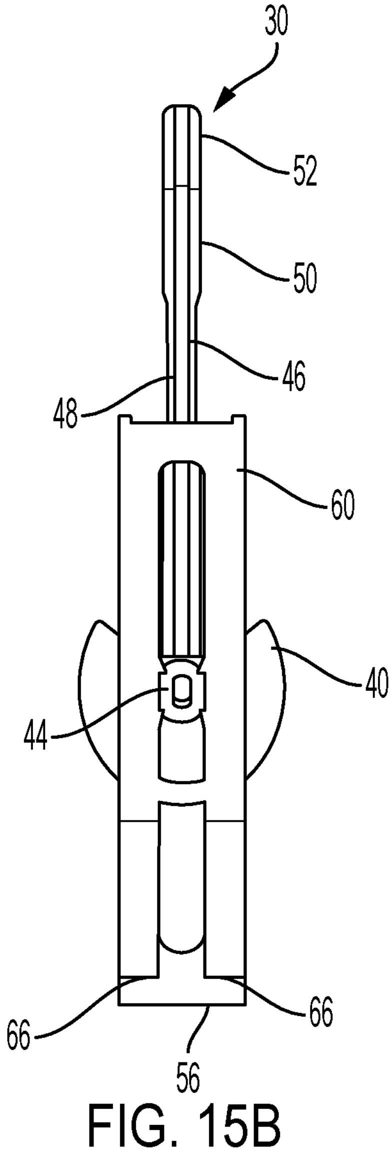
Figure 15C:
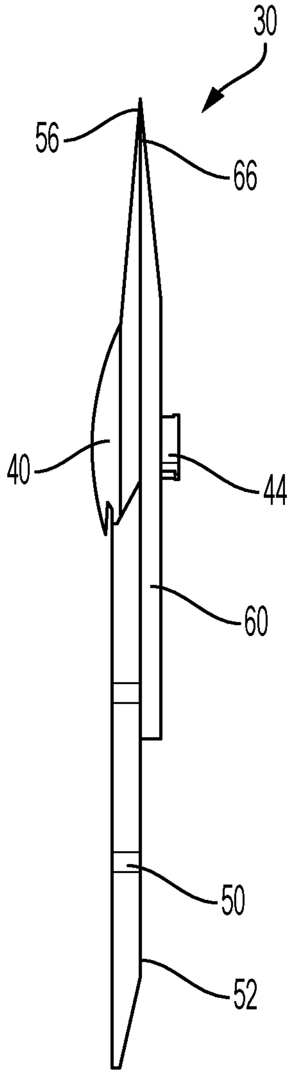

FIGS. 15A-15C are an isometric view, a bottom view, and a side view, respectively, of the shimming assembly 30 in the shimming action, in accordance with some embodiments. In the shimming action, the handle portion 52 of the slider 50 is slid toward the base 40 along the slider inclined surface 53 (shown in FIG. 11A-11B) of the slider 50. The slider 50 is slid toward the base 40 by a user applied sliding force applied to the handle portion 52. In one embodiment, the user applied force may be a pushing force. In some embodiments, the shimming action produces a wedging action (FIGS. 16-21) between the fenestration unit 10 and the base 40 by virtue of the slider 50 sliding between the fenestration unit 10 and the base 40, which is shown in FIGS. 16-21. In the wedging action (FIGS. 16-21), the base 40 may be moved such that the base 40 contacts the building opening 4 and the slider 50 contact the frame assembly 12.

In the embodiment shown in FIGS. 15A-15C, the handle portion 52 may further include a handle groove feature 46 and the spacer 60 includes a spacer tongue feature 68. The spacer tongue feature 68 is configured to slidably engage with the handle groove feature 46 of the handle portion 52. The handle groove feature 46 is shown in FIG. 15*b*. In some embodiments, the handle groove feature 46 of the handle portion 52 defines an inclined surface 48. The spacer tongue feature 68 may be configured to slidably engage with the inclined surface 48 of the handle groove feature 46. In other embodiments, it is contemplated that this configuration may be reversed where the spacer 60 includes the handle groove feature 46 and the handle portion 52 includes the spacer tongue feature 68. In still other embodiments, it is contemplated that the base 40 includes the handle groove feature 46 and the spacer includes the spacer tongue feature 68, and vice versa. In still other embodiments, it is contemplated that the slider 50 includes the spacer tongue feature 68 and the base 40 includes the handle groove feature 46, and vice versa.

FIGS. 16-24 show the operation of the shimming assembly 30 in the shimming action of FIGS. 15A-15C, in accordance with some embodiments.

Figure 16:
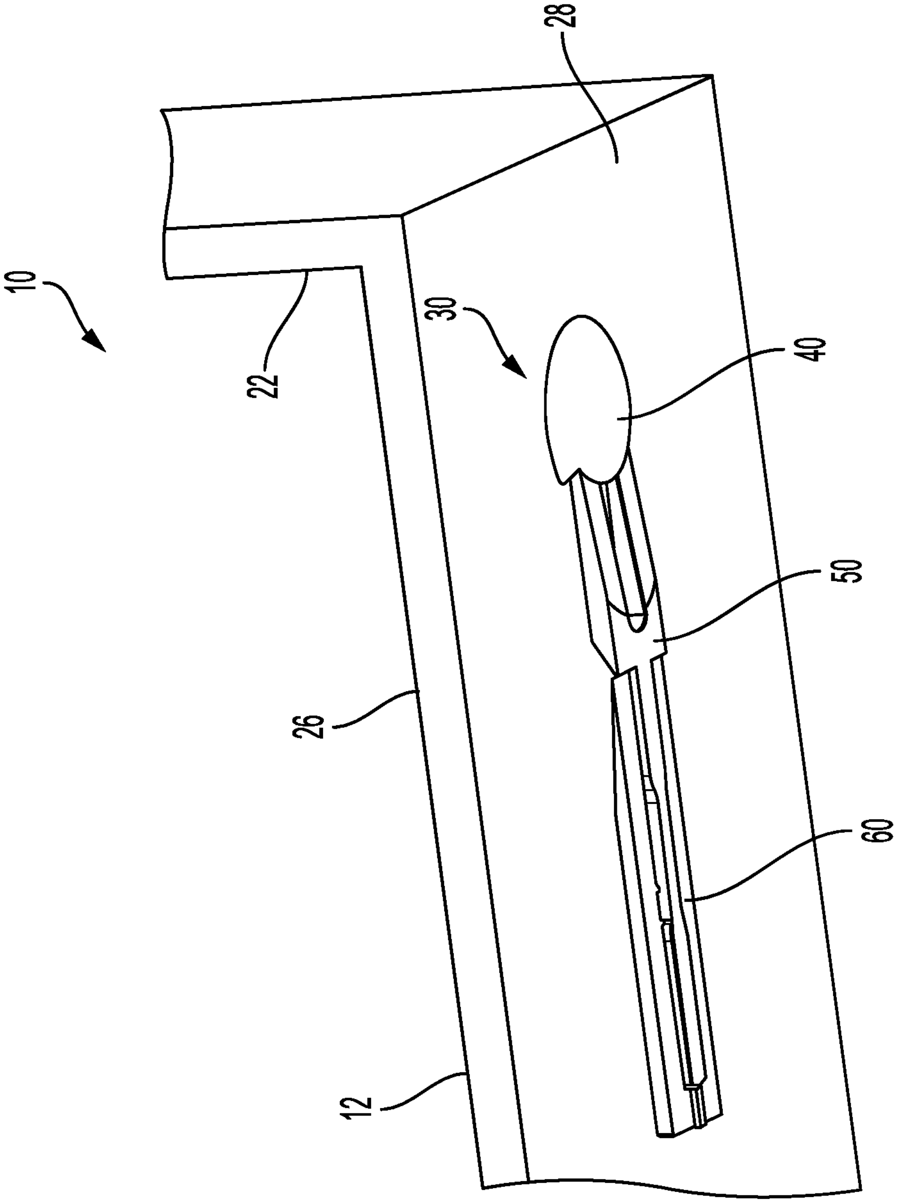
FIG. 16 is a schematic representation of the shimming assembly coupled to the sill of the frame, in accordance with some embodiments.

FIG. 16 is a schematic representation of the shimming assembly 30 coupled to the sill 26 of the frame 12 and in the stowed configuration (FIGS. 2 and 4), in accordance with some embodiments. FIG. 16 shows the shimming assembly 30 in the stowed configuration (FIGS. 2 and 4) within the intermediate portion 28 of the frame 12. In one embodiment, the shimming assembly 30 starts in the stowed configuration (FIGS. 2 and 4) prior to initiation of the shimming action. In other embodiments, the shimming assembly 30 may start in the active configuration (FIGS. 3 and 5), or in another intermediate configuration (FIG. 20) between the stowed configuration (FIGS. 2 and 4) and the active configuration (FIGS. 3 and 5) prior to initiation of the shimming action.

FIGS. 17-19 are schematic representations of the shimming assembly 30 coupled to the sill 26 of the frame 12 in the shimming action, in accordance with some embodiments. In one embodiment, as shown in FIG. 12, the shimming assembly 30 has been transitioned from the stowed configuration (FIGS. 2 and 4) of FIG. 16 to the active configuration (FIGS. 3 and 5). The shimming assembly 30 is transitioned from the stowed configuration (FIGS. 2 and 4) to the active configuration (FIGS. 3 and 5) by rotating the handle portion 52 of the slider 50 such that the handle portion 52 projects outwardly from between the frame 12 of the fenestration unit 10 and the opening 4 in the building 2. After transitioning to the active configuration (FIGS. 3 and 5), the shimming action is initiated.

FIGS. 18 and 19 show the shimming assembly 30 progressing in the shimming action. The shimming action is performed by the user applied sliding force. In this embodiment, the user applied sliding force is the pushing force. Embodiments where the user applied force is a pulling force are also contemplated. FIGS. 18 and 19 show the slider inclined surface 53 of the slider 50 slidably engaged with the base 40. In some embodiments, the slider inclined surface 53 extends past the base 40 while progressing in the shimming action as shown in FIG. 19. The shimming action may create a wedging force between the base 40 and the frame 12. The wedging force translates the fenestration unit 10 upward relative to the opening 4 in the building 2 such that the base 40 is moved away from the frame 12 or from the sill 26. The base may be put into contact with the opening 4 in the building 2. The base 40 may move through the gap 6 (FIG. 1) to contact the opening 4 in the building 2 when moving with the wedging force. The slider 50 may be put into contact with the frame assembly 12.

In some embodiments, there is at least one shimming assembly 30 coupled to the sill 26 and at least one shimming assembly 30 coupled to at least one of a lower portion of the first jamb 20 and a lower portion of the second jamb 22 (FIGS. 4 and 5). In this embodiment, the at least one shimming assembly 30 coupled to the sill 26 is operable to level the fenestration unit 10 within the opening 4 in the building 2. Further to the embodiment, the at least one shimming assembly 30 coupled to at least one of the lower portion of the first jamb 20 and the lower portion of the second jamb 22 is operable to center the fenestration unit 10 within the opening 4 in the building 2. Optionally, another at least one shimming assembly 30 can be coupled to at least one of a midpoint, or proximate thereto, of the first jamb 20 and a midpoint of the second jamb 22 (FIGS. 2 and 3). The at least one shimming assembly 30 coupled to at least one of a midpoint of the first jamb 20, or proximate thereto, and a midpoint of the second jamb 22, or proximate thereto, is operable to straighten the jambs 20, 22 within the opening 4 in the building 2. The at least one shimming assembly 30 located at, or proximate, at least one of the midpoints of jambs 20, 22 may be used for double-hung fenestration units, which may be sensitive to straightness of the jambs 20, 22 relative to the opening 4 in the building 2.

In the shimming action (FIGS. 17-19), the slider 50 may be configured such that it avoids contact with a surface of the opening 4 in the building 2. This configuration may to protect the seal system 8 (FIG. 1), which may include the flashing tape, that may be attached to the surface of the opening 4 in the building 2 or located in the gap 6 during installation of the fenestration unit 10. This configuration may prevent the seal system 8 (FIG. 1), or the flashing tape, from contacting the leading edge 56 of the slider 50, which may be sharp and could damage the seal system 8 (FIG. 1). The base 40 may be configured with the raised contact surface 42 that contacts the opening 4 in the building 2. This configuration and may protect the seal system 8 (FIG. 1) during either axial or rotational contact with the raised contact surface 42. The raised contact surface 42 of the base 40 may be configured to be coaxial to the pivot pin 44 to significantly reduce deployment and stowage torque. Similar to the leading edge 56 of the slider 50, the leading edge 66 of the spacer 60 may also be configured to avoid contact with the opening 4 in the building 2 to protect the seal system 8 (FIG. 1). However, other configurations are contemplated in which the slider 50 and/or the spacer 60 contact the opening 4 in the building 2.

Figure 20:
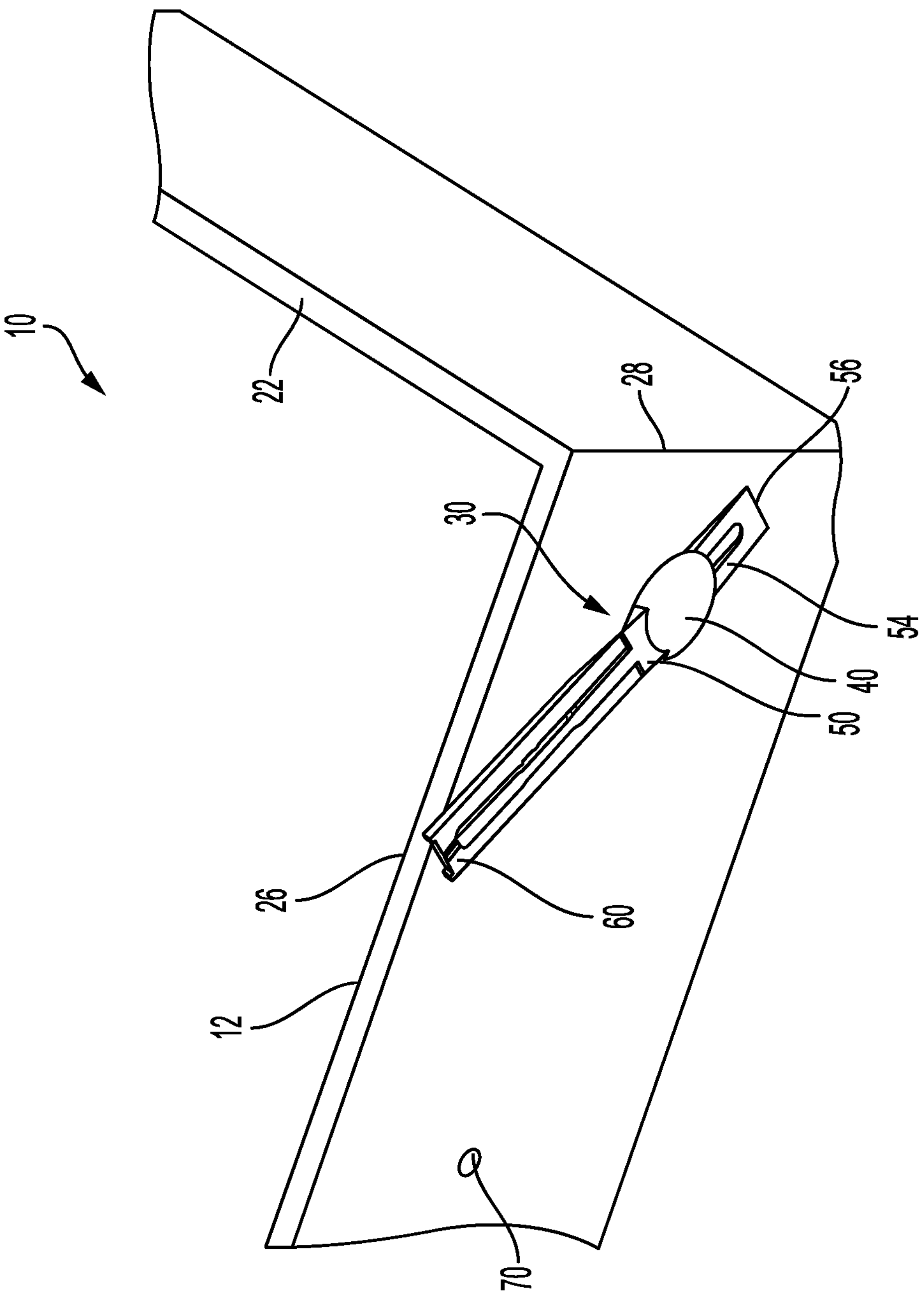
FIG. 20 is a schematic representation of the shimming assembly in an intermediate configuration between the active configuration and the stowed configuration, in accordance with some embodiments.

FIG. 20 is a schematic representation of the shimming assembly 30 in an intermediate configuration between the active configuration (FIGS. 3 and 5) and the stowed configuration (FIGS. 2 and 4), in accordance with some embodiments. The shimming assembly 30 is transitioned from the active configuration (FIGS. 3 and 5) to the stowed configuration (FIGS. 2 and 4) by rotating the handle portion 52 of the slider 50 such that the handle portion 52 no longer projects outwardly from between the frame 12 of the fenestration unit 10 and the opening 4 in the building 2. The shimming assembly may be stowed in the intermediate portion 28 of the frame 12 when in the stowed configuration (FIGS. 2 and 4). The shimming assembly 30 may be moved to the stowed configuration (FIGS. 2 and 4) at the conclusion of the shimming action (FIGS. 17-19).

Figure 21:
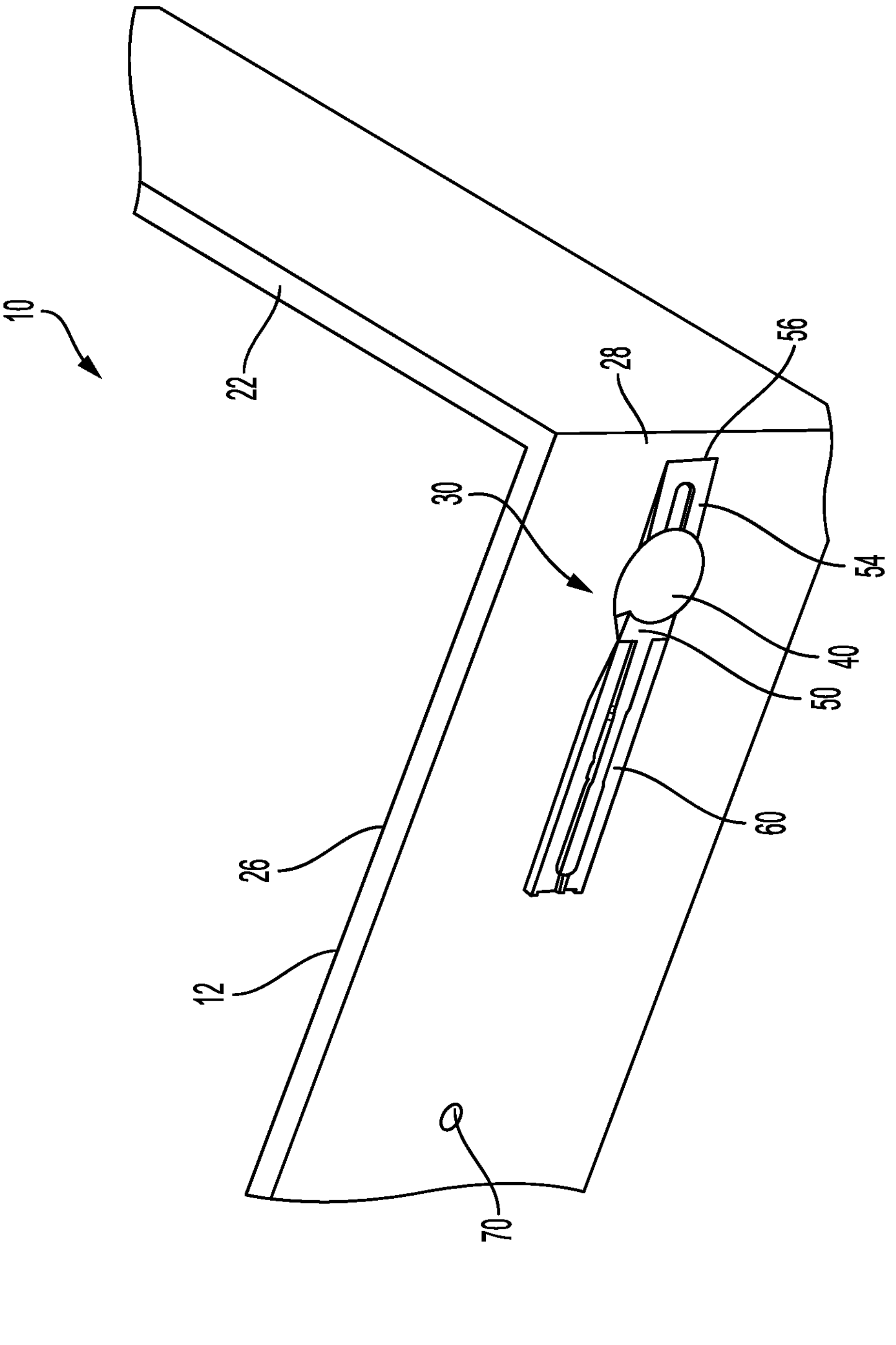
FIG. 21 is a schematic representation of the shimming assembly in the stowed configuration after the shimming action, in accordance with some embodiments.

FIG. 21 is a schematic representation of the shimming assembly 30 in the stowed configuration (FIGS. 2 and 4) after the shimming action (FIGS. 17-19) is complete, in accordance with some embodiments. In some embodiments, as shown in FIG. 21, the shimming assembly 30 may be transitioned to the stowed configuration (FIGS. 2 and 4) after the shimming action such that the slider 50 retains a shimmed position relative to the base 40. This can allow the shimming assembly 30 to maintain the fenestration unit 10 at a desired leveled, centered, and/or straightened position relative to the opening 4 in the building 2. The slider 50 may be configured to have a shallow angle on the slider inclined surface 53 such that the slider 50 will not drive back out of the shimmed position after the shimming action (FIGS. 17-19).

FIGS. 22-24 are schematic side-view representations of the shimming assembly 30, in accordance with some embodiments. FIG. 22 is a schematic side-view representation of the shimming assembly 30 in the active configuration (FIGS. 3 and 5), in accordance with some embodiments. FIGS. 23-24 are schematic side-view representations of the shimming assembly engaged in the shimming action (FIGS. 17-19), in accordance with some embodiments. In this embodiment, FIGS. 22-24 are side-views of the shimming action as shown and described above with respect to FIGS. 17-19.

In some embodiments, as shown in FIGS. 22-24, when the handle portion 52 is slid toward the base 40, the slider inclined surface 53 of the slider 50 increases in thickness from the first thickness T1 to the second thickness T2. The slider 50 is slidable against the base 40 from the first position P1 in which the first thickness T1 defines a first overall height H1 of the shimming assembly 30 and the second position P2 in which the second thickness T2 defines a second overall height H2 of the shimming assembly 30. The first and second overall heights H1, H2 of the shimming assembly 30 may be defined by a combined thickness of the slider 50 and the base 40. In some embodiments, the second thickness T2 is greater than the first thickness T1 and correspondingly, the second overall height H2 is greater than the first overall height H1. In some embodiments, the first position P1, the first thickness T1, and the first overall height H1 are defined by the locations of the slider 50 and base 40 prior to the shimming action (FIGS. 17-19). In some embodiments, the second position P2, the second thickness T2, and the second overall height H2 are defined by the locations of the slider 50 and the base 40 after the shimming action (FIGS. 17-19) and in the shimmed position (FIG. 21). In this embodiment, the second position P2, the second thickness T2, and the second overall height H2, define the shimmed position (FIG. 21). In some embodiments, the shimming assembly 30 retains the second position P2, the second thickness T2, and the second overall height H2 when rotating back to the stowed configuration (FIGS. 2 and 4) after the shimming action. The slider 50 and base 40 may have a minimum thickness of about 0.170" inches.

In the embodiment shown in FIGS. 22-24, the spacer 60 is not moved in a shimming action. As such, the spacer 60 may continue to project from between the fenestration unit 10 and the opening 4 in the building 2. In this embodiment, the spacer 60 may be broken off the shimming assembly 30 by the user applied break off force at the break off connection 69. In another embodiment, as shown in FIGS. 19-21, the spacer 60 is not moved in a shimming action and is not broken off from the shimming assembly at the break off point 69. Instead, the spacer 60 is moved to the stowed configuration (FIGS. 2 and 4) with the shimming assembly 30. Both of these embodiments and configurations are contemplated.

FIGS. 25-28 are schematic side-view representations of the shimming assembly 30 including the spacer 60 in the shimming action, in accordance with some embodiments. The shimming action with the spacer 60 may be similar to the shimming action described above without the spacer 60 in FIGS. 16-24. In FIGS. 25-28, the shimming assembly 30 is coupled to the sill 26 of the frame. However, the shimming assembly may be coupled to any one of the frame members in the plurality of frame members 25.

Figure 25:
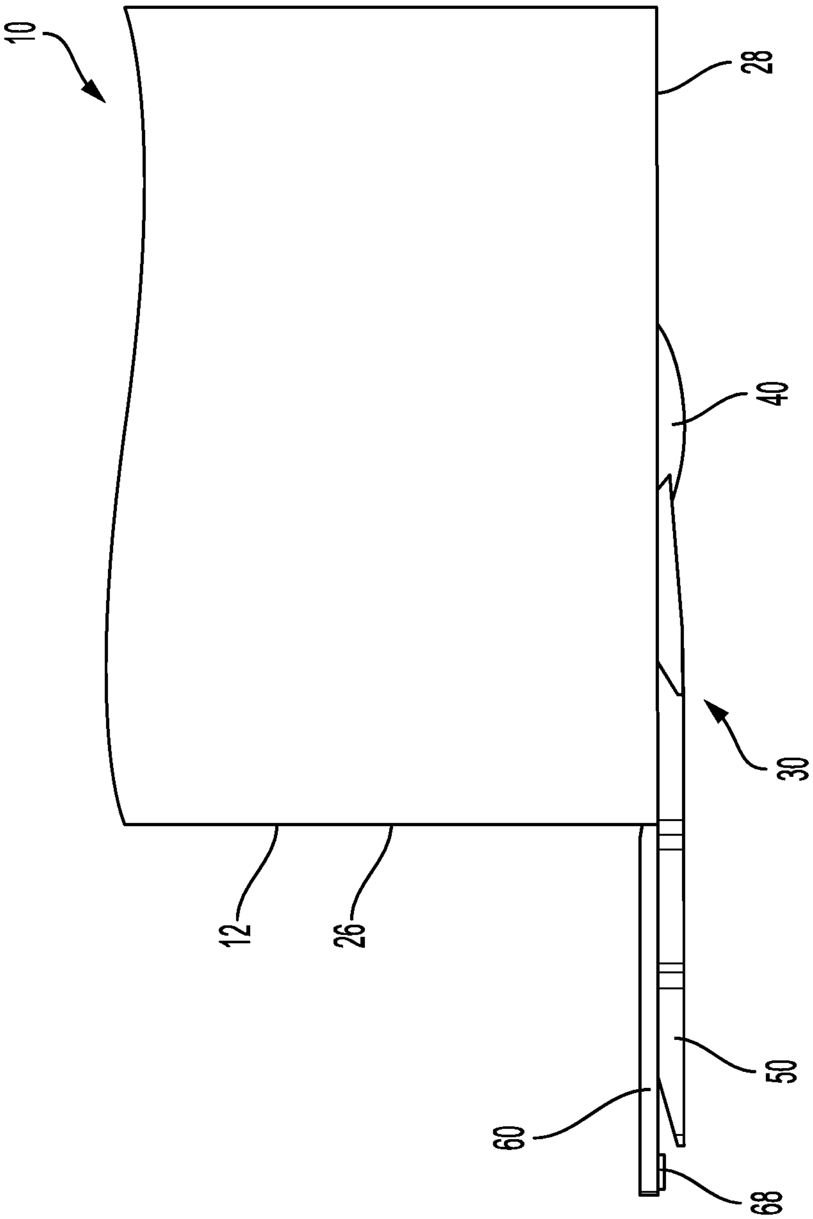
FIG. 25 is a schematic side-view representation of the shimming assembly including a spacer in the active configuration, in accordance with some embodiments.

FIG. 25 is a schematic side-view representation of the shimming assembly 30 including a spacer 60 in the active configuration (FIGS. 3 and 5), in accordance with some embodiments. In some embodiments, and as described with respect to FIGS. 15A-15C, the spacer 60 is configured to be receivable with the slider 50.

Figure 26:
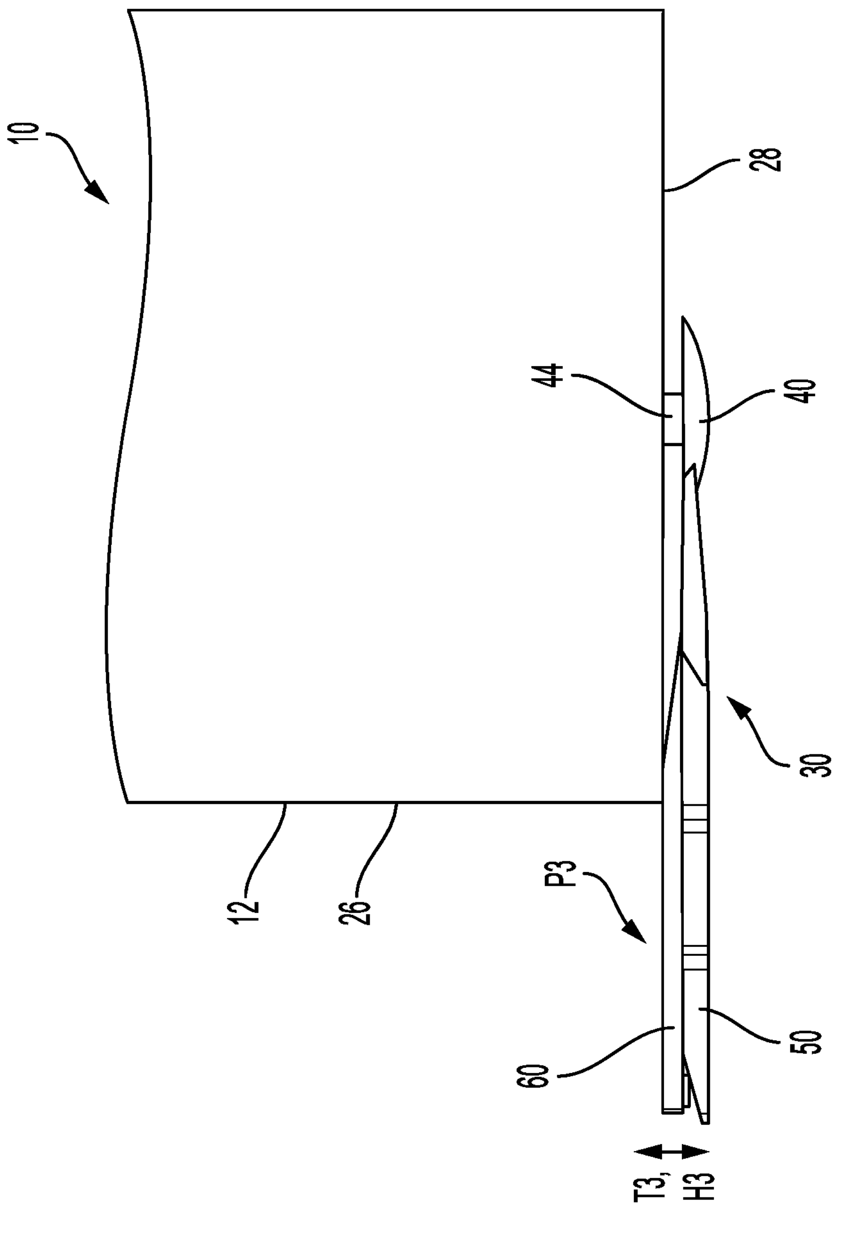
FIGS. 26 and 27 are schematic side-view representations of the shimming assembly including the spacer engaged in the shimming action, in accordance with some embodiments.
Figure 27:
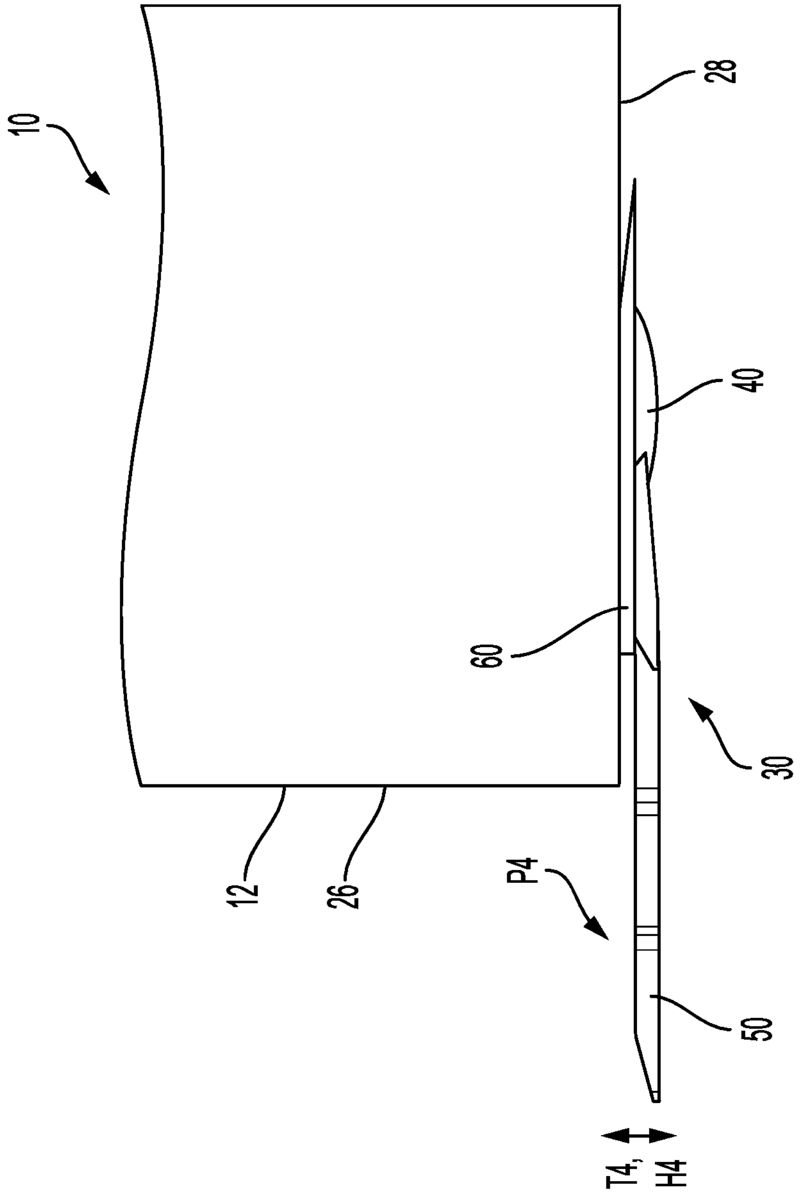

FIGS. 26-27 are schematic side-view representations of the shimming assembly 30 including the spacer 60 in the shimming action, in accordance with some embodiments. The spacer 60 may be configured to slide toward the base 40 in response to the user applied sliding force. In this embodiment, the user applied sliding force may be a pushing force. In some embodiments, the spacer 60 is initiated in the shimming action before the slider 50 is initiated in the shimming action such that the spacer 60 is move toward the base 40 before the slider 50 is moved toward the base 40. It is also contemplated that the slider 50 may be moved toward the base before the spacer 60 is moved toward the base 40. In some embodiments, the spacer 60 is slidable between the fenestration unit 10 and the slider 50. In other embodiments, the spacer 60 is slidable between the slider 50 and the base 40.

Figure 28:
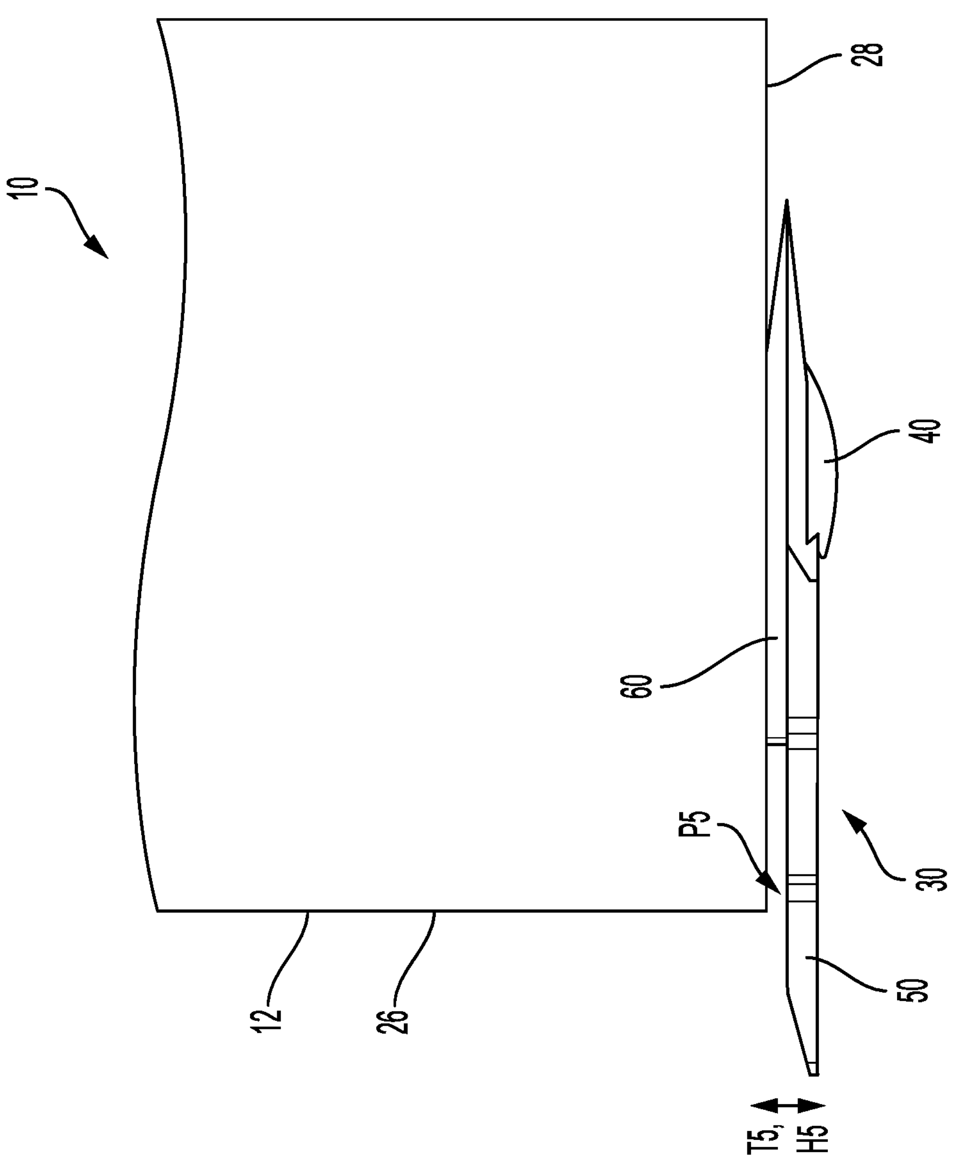
FIG. 28 is a schematic side-view representation of the shimming assembly including the spacer in a shimmed position, in accordance with some embodiments.

In some embodiments, as shown in FIGS. 26 and 27, the spacer 60 increases the thickness of the shimming assembly 30 from a third thickness T3 to a fourth thickness T4. In some embodiments, the third overall height T3 is greater than both the second overall height H2 and the first overall height H1. The spacer 60 is slidable against the base 40 from a third position P3 in which the third thickness T3 defines the third overall height H3 of the shimming assembly 30 and a fourth position P4 in which the fourth thickness T4 defines a fourth overall height of the shimming assembly 30. In some embodiments, as shown in FIG. 26, the third position P3, the third overall height H3, and the third thickness T3 are defined by the locations of the slider 50, the base 40, and the spacer 60 prior to the shimming action. In some embodiments, as shown in FIG. 27, the fourth position P4, the fourth overall height H4, and the fourth thickness T4 are defined by the locations of the slider 50, the base 40, and the spacer 60 after the shimming action of the spacer 60. In some embodiments, as shown in FIG. 28, the shimming assembly has a fifth overall height H5 defined by a fifth thickness T5 and a fifth position P5. In this configuration, the fifth overall height H5, the fifth thickness T5, and the fifth position P5 are defined by the location of the slider 50, the base 40, and the spacer 60 after the shimming action of both the spacer 60 and the slider 50.

In some embodiments, the fifth overall height H5 is greater than both the fourth overall height H4 and the third overall height H3. Similarly, the fifth thickness T5 may be greater than both the fourth thickness T4 and the third thickness T3. In some embodiments, the fourth overall height H4 is greater than the third overall height and the fourth thickness T4 may be greater than the third thickness T3. In other embodiments, the fourth overall height H4 and the third overall height H3 are the same. In some embodiments, the spacer 60 is about 0.170" inches in thickness itself. Further to this embodiment, the overall fourth height H4 of the shimming assembly 30 with the spacer 60 may be about 0.340" inches. The overall fifth height H5 of the shimming assembly 30 with the spacer 60 may be increased above 0.340" inches.

FIG. 28 is a schematic side-view representation of the shimming assembly 30 including the spacer 60 in a shimmed spacer position, in accordance with some embodiments. In some embodiments, after the shimming action, the spacer 60 no longer projects between the fenestration 10 and gap 6 in the shimmed spacer position such that the spacer 60 does not need to be broken off at the break off connection 69. In other embodiments, after the shimming action, the spacer 60 continues to project from between the fenestration unit 10 and the gap 6 after the shimming action such that the break off feature 69 needs to be broken off by the user applied break off force.

Various modifications and additions can be made to the exemplary embodiments discussed without departing from the scope of the present invention. For example, while the embodiments described above refer to particular features, the scope of the invention also includes embodiments having different combinations of features and embodiments that do not include all of the above-described features.

What is claimed is:

1. A shimming assembly positionable between a first surface and a second surface, the shimming assembly comprising:

a base that defines a raised contact surface and a pivot pin defining a rotation axis of the shimming assembly, the base including a base inclined surface; and a slider that is slidably coupled to the base such that the slider is slidable along the base inclined surface in response to a user-applied sliding force, the slider being coupled to the base such that the slider is rotatable about the rotation axis defined by the pivot pin in response to a torque to transition the shimming assembly from an active configuration to a stowed configuration, wherein a longitudinal axis of the shimming assembly extends in a direction along the first and second surfaces in the stowed configuration and the longitudinal axis extends in a direction away from the first and second surfaces in the active configuration.

2. The shimming assembly of claim 1, wherein the slider further includes a slider inclined surface that is slidable along the base inclined surface.

3. The shimming assembly of claim 2, wherein the slider inclined surface and the base inclined surface engage in a complementary fit.

4. The shimming assembly of claim 2, wherein the base inclined surface defines a groove, and the slider inclined surface defines a tongue that is engaged with the groove of the base.

5. The shimming assembly of claim 1, wherein the raised contact surface of the base is dome-shaped.

6. The shimming assembly of claim 1, wherein the slider further includes a slot that receives the pivot pin to slidably couple the slider and the base.

7. The shimming assembly of claim 1, wherein the shimming assembly further includes a handle portion associated with the slider, the handle portion being operable to receive the sliding force and the torque.

8. The shimming assembly of claim 1, further comprising a spacer that is receivable between the slider and the base, the spacer including a spacer inclined surface that is operable to slidably engage the base inclined surface.

9. The shimming assembly of claim 8, wherein the spacer is coupled to the slider by a break off connection such that the spacer is configured to be broken off from the slider via a break off force on the spacer without substantially damaging the slider.

10. The shimming assembly of claim 1, wherein the pivot pin is positioned along a longitudinal centerline of the base.

11. The shimming assembly of claim 1, wherein the longitudinal axis extends in a substantially perpendicular direction relative to the first and second surfaces in the active configuration.

12. A fenestration unit comprising:

a frame assembly including a frame member; and a shimming assembly rotatably coupled to the frame member such that the shimming assembly is rotatable between an active configuration in which the shimming assembly extends away from the frame member and a stowed configuration, in which the shimming assembly extends along the frame member, the shimming assembly including, a base including a pivot pin coupled to the frame member, a slider that is slidably coupled to the base such that sliding the slider relative to the base increases an overall thickness of the shimming assembly, and a handle portion associated with the slider, the handle portion operable to receive a sliding force on the slider to increase the overall thickness of the shimming assembly.

13. The fenestration unit of claim 12, wherein the frame assembly is installed in a building opening and the active configuration of the shimming assembly is defined by the handle portion projecting outwardly from between the frame member and the building opening, the handle portion receiving the sliding force when in the active configuration.

14. The fenestration unit of claim 12, wherein the slider includes a slot in which the pivot pin is received such that the pivot pin is free to slide within the slot, wherein, when the pivot pin engages with edges of the slot, the pivot pin is inhibited from rotating within the slot.

15. The fenestration unit of claim 12, wherein the frame assembly is installed in a building opening, the frame member is a sill member, and the shimming assembly is configured to increase in thickness by sliding the slider such that the fenestration unit is translated upward within the building opening.

16. A fenestration unit comprising:

a frame assembly configured to be installed in a building opening; and a shimming assembly coupled to the frame assembly, the shimming assembly having an active configuration in which the shimming assembly projects more outwardly in a front-to-back direction from the frame assembly relative to a stowed configuration in which the shimming assembly projects along the frame assembly, the shimming assembly including, a base defining a raised contact surface and a pivot pin, the base rotatably coupled to the frame assembly and including a base inclined surface, a slider slidably coupled to the base such that the slider and the base are operable to rotate together in response to a torque to the slider and the base, and a handle portion associated with at least one of the base and the slider, the handle portion operable to receive the torque to rotate the base and the slider to transition the shimming assembly from the active configuration to the stowed configuration.

17. The fenestration unit of claim 16, wherein the slider further includes a slot, the slot operable to engage the pivot pin such that the slider and the base rotate together.

18. The fenestration unit of claim 16, wherein the active configuration is defined by the handle portion projecting outwardly from between the frame assembly and the building opening beyond an interior plane of the fenestration unit.

19. The fenestration unit of claim 18, wherein the stowed configuration is defined by the handle portion no longer projecting outwardly from between the frame assembly and the building opening and the handle portion being positioned within the interior plane of the fenestration unit.

20. The fenestration unit of claim 16, wherein the raised contact surface is dome-shaped.

* * * * *